(12) United States Patent
Kawagoe et al.

(10) Patent No.: US 9,181,373 B2
(45) Date of Patent: Nov. 10, 2015

(54) POLYOXYALKYLENE MODIFIED VINYL ALCOHOL-BASED POLYMER AND USE THEREOF

(75) Inventors: Masako Kawagoe, Kurashiki (JP); Shinsuke Nii, Tainai (JP); Kazuki Tokuchi, Kurashiki (JP); Masato Nakamae, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/234,281

(22) PCT Filed: Jul. 19, 2012

(86) PCT No.: PCT/JP2012/068291
§ 371 (c)(1),
(2), (4) Date: Jan. 22, 2014

(87) PCT Pub. No.: WO2013/015185
PCT Pub. Date: Jan. 31, 2013

(65) Prior Publication Data
US 2014/0178609 A1    Jun. 26, 2014

(30) Foreign Application Priority Data

Jul. 22, 2011 (JP) .................. 2011-161355
Jan. 12, 2012 (JP) .................. 2012-003900
Feb. 24, 2012 (JP) .................. 2012-039241
May 25, 2012 (JP) .................. 2012-119358

(51) Int. Cl.
| | |
|---|---|
| *B32B 3/00* | (2006.01) |
| *C08F 218/08* | (2006.01) |
| *B41M 5/52* | (2006.01) |
| *D21H 27/00* | (2006.01) |
| *D21H 19/60* | (2006.01) |
| *D21H 21/16* | (2006.01) |
| *B32B 7/06* | (2006.01) |
| *B32B 27/30* | (2006.01) |
| *C09D 131/04* | (2006.01) |
| *C08F 290/06* | (2006.01) |
| *C09D 151/08* | (2006.01) |
| *B32B 7/12* | (2006.01) |
| *B32B 29/00* | (2006.01) |

(52) U.S. Cl.
CPC ............... *C08F 218/08* (2013.01); *B32B 7/06* (2013.01); *B32B 7/12* (2013.01); *B32B 27/306* (2013.01); *B32B 29/005* (2013.01); *B41M 5/5254* (2013.01); *C08F 290/062* (2013.01); *C09D 131/04* (2013.01); *C09D 151/08* (2013.01); *D21H 19/60* (2013.01); *D21H 21/16* (2013.01); *D21H 27/001* (2013.01); *B32B 2250/26* (2013.01); *B32B 2255/12* (2013.01); *B32B 2255/26* (2013.01); *B32B 2307/54* (2013.01); *B32B 2307/726* (2013.01); *B32B 2307/7265* (2013.01); *B32B 2307/748* (2013.01); *B32B 2554/00* (2013.01); *B41M 2205/32* (2013.01); *Y10T 428/1476* (2015.01); *Y10T 428/31895* (2015.04)

(58) Field of Classification Search
CPC .... C08F 218/08; C08F 216/06; C08F 118/08; B32B 27/306; C09D 129/04; C09D 131/04
See application file for complete search history.

(56) References Cited

U.S. PATENT DOCUMENTS

| | | | |
|---|---|---|---|
| 6,391,923 | B1 | 5/2002 | Pöllmann et al. |
| 2002/0103290 | A1 | 8/2002 | Pollmann et al. |
| 2005/0025913 | A1 | 2/2005 | Jikihara et al. |
| 2007/0179245 | A1 | 8/2007 | Stark et al. |
| 2013/0338306 | A1 | 12/2013 | Kawagoe et al. |

FOREIGN PATENT DOCUMENTS

| | | |
|---|---|---|
| JP | 59-155408 | 9/1984 |
| JP | 60-204390 | 10/1985 |
| JP | 63-168437 | 7/1988 |

(Continued)

OTHER PUBLICATIONS

International Search Report issued Oct. 30, 2012, in PCT/JP2012/068291, filed Jul. 19, 2012.

*Primary Examiner* — Elizabeth Mulvaney

(74) *Attorney, Agent, or Firm* — Oblon, McClelland, Maier & Neustadt, L.L.P.

(57) ABSTRACT

Provided is a polyoxyalkylene modified vinyl alcohol-based polymer comprising a polyoxyalkylene group in a side chain, wherein the polymer has a viscosity average degree of polymerization of not less than 150 and not more than 5000, a degree of saponification of not less than 40 mol % and not more than 99.99 mol %, and a polyoxyalkylene group modification rate of not less than 0.05 mol % and not more than 10 mol %; and the polyoxyalkylene group is composed of a polyoxypropylene block and a (poly)oxyethylene block and is represented by the following general formula (I). Such polymer is excellent in temperature-sensitive thickening properties.

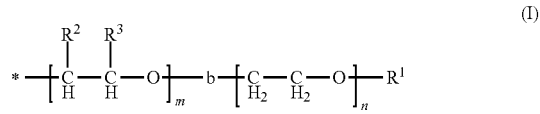

(in the general formula (I), $R^1$ denotes a hydrogen atom or an alkyl group having a carbon number of from 1 to 8; either one of $R^2$ and $R^3$ is a methyl group and the other is a hydrogen atom; and $10 \leq m \leq 40$ and $1 \leq n \leq 50$).

20 Claims, No Drawings

(56) References Cited

FOREIGN PATENT DOCUMENTS

| | | |
|---|---|---|
| JP | 1-158016 | 6/1989 |
| JP | 6-136036 | 5/1994 |
| JP | 7-137434 | 5/1995 |
| JP | 11-322866 | 11/1999 |
| JP | 2000-327967 | 11/2000 |
| JP | 2001-19720 | 1/2001 |
| JP | 2001-64332 | 3/2001 |
| JP | 2001-150805 | 6/2001 |
| JP | 2001-295199 | 10/2001 |
| JP | 2003-155307 | 5/2003 |
| JP | 2004-256926 | 9/2004 |
| JP | 2004-270049 | 9/2004 |
| JP | 2005-42008 | 2/2005 |
| JP | 2007-527941 | 10/2007 |
| JP | 2009-102641 | 5/2009 |
| JP | 2010-230826 | 10/2010 |
| JP | 2011-184812 | 9/2011 |
| JP | 2012-51957 | 3/2012 |
| WO | 2010/113567 A1 | 10/2010 |
| WO | 2011/070800 A1 | 6/2011 |

POLYOXYALKYLENE MODIFIED VINYL ALCOHOL-BASED POLYMER AND USE THEREOF

TECHNICAL FIELD

The present invention relates to a polyoxyalkylene modified vinyl alcohol-based polymer containing a polyoxyalkylene group in side chain and a method of producing the same. The present invention also relates to an aqueous solution and a coating agent containing the polyoxyalkylene modified vinyl alcohol-based polymer, a coated article wherein the coating agent is coated on a surface of a substrate, and an ink jet recording material wherein the coating agent is coated on a surface of a substrate and a method of producing the same. Further, the present invention relates to a film, release paper base paper, and greaseproof paper containing the polyoxyalkylene modified vinyl alcohol-based polymer and a method of producing the same.

BACKGROUND ART

Vinyl alcohol-based polymers (hereinafter, a vinyl alcohol-based polymer may be abbreviated as "PVA") represented by polyvinyl alcohol are one of the few crystalline water soluble polymers. PVA is used as a raw material for a synthetic fiber, vinylon, and the like utilizing strength properties thereof. The PVA is also utilized for paper processing agents, textile sizing agent, dispersants, adhesives, films, and the like utilizing the excellent film formation ability, surfactant ability, hydrogen bond formation ability, and the like. Further, since the PVA has excellent interfacial properties and strength properties, it is also utilized for stabilizers for emulsion, various binders, and the like.

The PVA is also subject to higher functionality by improving specific performances by controlling the crystallinity or introducing functional groups, and so-called modified PVA is variously developed as well.

Among them, PVA having a polyoxyalkylene (hereinafter, may be abbreviated as "POA") group is variously developed. For example, Patent Document 1 discloses a method of synthesizing PVA having a POA group in which saponified is a copolymer of a vinyl ester and POA having an allyl group at an end, a methacrylic ester having a POA group, or a methacrylamide group containing compound having a POA group bonded to a nitrogen atom. After development of such synthesis method, PVA having a POA group has come to be utilized for a variety of applications.

The PVA is utilized in paper processing applications for improvement in quality of printed matter. The PVA is utilized in the paper processing applications for binders for fillers in ink jet recording materials, surface sizing agents for general paper, undersizing agents for art paper and coated paper, dispersants for fluorescent dyes, and the like.

Recently, ink jet printers have been increasingly utilized, and so ink jet recording materials are used for color proof in commercial printing, design image output in the design field, drafts for overhead projectors, and the like. The properties demanded for an ink jet recording material in these applications may include that an ink receiving layer surface is high gloss, that the transparency of the ink receiving layer is high, that the image density is high, that the color reproducibility is good, that the ink absorbency is high, that the dot reproducibility is good, and the like.

To the above demands for an ink jet recording material, there is a known recording material equipped with a porous layer composed of inorganic microparticles and a hydrophilic binder as an ink receiving layer (refer to Patent Documents 2 and 3). This recording material realizes both high ink absorbency and waterproofness by an ink absorbency mechanism utilizing the capillary action. However, in order to form capillaries in the ink receiving layer, it is usually required to contain a large amount of microparticles relative to the binder. In this case, the ratio of the binder to the microparticles becomes low, and the ink receiving layer becomes high in rigidity and becomes hard. Therefore, in forming an ink receiving layer by coating a coating liquid composed of the inorganic microparticles and the hydrophilic binder on a substrate, there used to be a problem that cracks easily occur in the ink receiving layer due to the occurrence of internal stress in the stage of drying a coating film or incorporation of minute foreign substances.

For such problem of cracks in the coating film, a method of preventing cracks by thickening the coating film before drying the coating film is considered. As one of such methods, there is proposed a method comprising cooling a coating film to not more than 20° C. after coating using a coating liquid in which boric acid is added as a curing agent to polyvinyl alcohol having a high degree of polymerization (refer to Patent Document 4). In this method, as the coating film is cooled to not more than 20° C., a strong three dimensional structure is formed in the coating film due to the interaction between the polyvinyl alcohol and the boric acid, and as a result, it is supposed to allow prevention of cracks. However, since this method requires the temperature of the coating film to be lowered once after coating, there used to be a problem that the energy loss is large. In addition, since the temperature of the coating film is lowered once after coating, there also used to be a problem that it takes time to form a coating film and it is not possible to increase the production rate. Further, since this method uses polyvinyl alcohol having a high degree of polymerization, the viscosity of the coating liquid at room temperature used to be high. Accordingly, in respect of the handling properties, it used to be required to keep the concentration of the coating liquid low. In a case that the concentration of the coating liquid is low, it used to take time to dry the coating film and the production rate used to decrease even more.

As a method of controlling the viscosity of a coating liquid containing PVA, there is also considered, other than the method comprising adding an additive having reactivity to PVA as described above, a method comprising using modified PVA. There are some, although not so many, reported attempts to control behavior of the solution viscosity of PVA relative to the temperature changes by modifying PVA. Patent Document 5 describes a block copolymer and a graft copolymer composed of a polyvinyl alcohol component and a polyalkenyl ether component exhibiting a cloud point in an aqueous solution as PVA exhibiting thermal responsivity in an aqueous solution. However, in a case of a block copolymer of polyvinyl alcohol and poly (2-methoxyethyl vinyl ether), there used to be a problem that the temperature dependency of aqueous solution viscosity of the block copolymer in a temperature range of from 40° C. to 90° C. is less compared with a case of polyvinyl alcohol. There is also a known graft copolymer having polyvinyl alcohol as a stem component and poly(2-methoxyethyl vinyl ether) as a branch component (refer to Patent Document 6). However, there used to be a problem that the aqueous solution viscosity of the graft polymer increases around the temperature where an aqueous solution of each polymer used for the stem component and the branch component exhibits a cloud point and the aqueous solution becomes turbid.

Patent Document 7 describes PVA having a polyoxyalkylene group. The temperature-sensitive thickening properties are supposed to be given to the PVA by adjusting the polyoxyalkylene group content or the number of repeating units in the polyoxyalkylene group in the PVA. Then, it is described that the temperature-sensitive thickening properties of the PVA is applied to enable production of an ink jet recording material with fewer cracks.

However, the PVA described in Patent Document 7 used to have a polyoxyalkylene group composed mainly of a polyoxypropylene group. Although such PVA having a polyoxyalkylene group composed of a single oxyalkylene unit has the temperature-sensitive thickening properties, there used to be a case that the properties do not occur when the PVA concentration in the solution is low. Therefore, with respect to the cracks in a coating film due to drying, the improvement effect has been insufficient although there is a little. Patent Document 8 describes PVA having a polyoxybutylene group, while the PVA has high viscosity around room temperature and handling properties thereof has been a drawback.

PVA is also utilized for release paper. The release paper has a release performance on a surface thereof and is used as a substrate to obtain adhesive labels, adhesive tapes, industrial adhesive paper, and the like and also as mold release paper and the like. The release paper is usually obtained by coating oil varnish containing a silicone resin, a solvent (toluene and the like), and the like capable of forming a water repellent and oil repellent coating film on paper to form a release layer. However, paper is porous between pulp fibers and the like, and thus has high permeability and gas permeability. Therefore, when oil varnish is coated directly on a paper surface, the oil varnish turned out to permeate in the paper and release paper having a sufficient release performance used not to be obtained. Further, since the oil varnish permeates in the paper, which increases the amount of coating and is uneconomical.

For such problem, a method of utilizing the excellent film formation ability and grease resistance is generally employed. That is, a method comprising coating oil varnish on release paper base paper prepared by coating an aqueous PVA solution as a coating agent (filling agent) in advance on a paper surface. However, usual PVA is poor in waterproofness, although excellent in grease resistance for release layer paint and organic solvents contained therein, and there used to be a problem that PVA elutes due to humidification during the adhesive layer process for blocking.

For the purpose of improvement of the waterproofness of PVA, release paper base paper is proposed that uses modified PVA containing α-olefin unit having a carbon number of 4 or less (refer to Patent Document 9). However, even more improvement in the performances has been sought.

For the purpose of such performance improvement, release paper base paper is proposed that uses modified PVA containing a polyoxyalkylene group in side chain (refer to Patent Document 10). However, an aqueous solution of the modified PVA is high in viscosity even around room temperature and handling properties thereof have been a drawback.

PVA is also utilized for greaseproof paper. The greaseproof paper is defined as "1) Generic term for paper having grease resistance. 2) Paper or board having extremely great resistance to permeation of grease or fat." in "Paper, board and pulp—Vocabulary." of JIS P 0001: 1998.

In packaging materials for foods, greaseproof paper having grease resistance is widely used. Among all, greaseproof paper is used for foods containing a lot of oil and fat components, such as chocolate, pizza, and donut, not to allow oil to permeate the packaging material. When the oil and fat components contained in foods permeate the packaging material, various types of inconvenience occur. For example, oil permeates even through a surface where the food is not in contact to create oil stain, which detracts from the appearance and reduces the commodity value, and the oil stain darkens a printed area resulting in causing characters not to be legible or decreasing the OCR qualifications of a bar code, a QR code (registered trademark), or the like. There are also problems of oil transfer to clothing for staining and the like, so that greaseproof paper is used for an area in contact with foods.

Conventionally, in order to cause greaseproof paper to develop grease resistance, a fluorine-based compound, particularly a perfluoro fluorine-based compound has been used as a grease resistant agent. However, since a perfluoro fluorine-based compound produces perfluorooctanoic acid or perfluorosulfonic acid by heat treatment, there is a concern for safety. Therefore, various fluorine-based compounds with enhanced safety are developed, however realizing both grease resistance and safety still has been insufficient.

In addition, it is known that PVA may be used as a non-fluorine-based grease resistant agent. PVA is a hydrophilic resin and forms a strong film. Therefore, PVA prevents permeation of oil and is excellent in grease resistance. As a method of giving grease resistance to a paper substrate by PVA, known are, for example, a method comprising forming a coating layer containing PVA and shellac on at least one surface of a substrate sheet (refer to Patent Document 11), a method comprising forming a coating layer containing PVA cured using an isocyanate compound on at least one surface of a substrate sheet (refer to Patent Document 12), and the like.

However, in the above methods, while it is possible to improve the waterproofness, it is not possible to improve the grease resistance sufficiently. In addition, in the above methods, PVA easily permeates paper, so that pinholes easily occur. Therefore, it is required to increase the amount of coating a coating agent containing PVA and the drying load becomes too large, which used to be a problem of extremely reducing the productivity.

PVA is also utilized for a film. Then, PVA having a POA group is also utilized for a film. For example, Patent Document 13 proposes a resin for melt molding capable of being used as a raw material for a film, Patent Document 14 proposes a film for packaging alkaline substances, and Patent Document 15 proposes a flexible waterproof film in which heat treatment of the film is devised.

In above Patent Documents 1, 13 through 15, to obtain a polymer or a film having excellent water solubility at low temperatures, PVA having an oxyethylene group or a polyoxypropylene group as a POA group is used. However, there used to be a problem that a film containing such PVA has decreased film strength.

PRIOR ART DOCUMENTS

Patent Documents

[Patent Document 1] JP 59-155408A
[Patent Document 2] JP 60-204390A
[Patent Document 3] JP 7-137434A
[Patent Document 4] JP 2001-150805A
[Patent Document 5] JP 6-136036A
[Patent Document 6] JP 11-322866A
[Patent Document 7] JP 2005-42008A
[Patent Document 8] WO 2010/113567
[Patent Document 9] JP 2001-295199A
[Patent Document 10] WO 2011/070800
[Patent Document 11] JP 2004-256926A
[Patent Document 12] JP 2004-270049A
[Patent Document 13] JP 2003-155307A

[Patent Document 14] JP 63-168437A
[Patent Document 15] JP 1-158016A

SUMMARY OF THE INVENTION

Problems to be Solved by the Invention

It is an object of the present invention to provide PVA excellent in temperature-sensitive thickening properties and a convenient method of producing the same. Further in detail, it is an object to provide PVA that is preferably used for producing an inkjet recording material, thermal paper, release paper base paper, greaseproof paper, a film, and the like. It is also an object of the present invention to provide an aqueous solution and a coating agent containing the PVA, and a coated article wherein the coating agent is coated on a surface of a substrate. It is further an object of the present invention to provide: an ink jet recording material having an ink receiving layer that has few cracks in a surface thereof and is excellent in ink absorbency and a method of producing the same; release paper base paper that is excellent in filling properties, grease resistance, and waterproofness, a method of producing the same, and release paper and a laminate having release properties using the same; greaseproof paper that is excellent in grease resistance and waterproofness and a method of producing the same; and a film having high strength and high stretching properties and a method of producing the same.

Means for Solving the Problems

The present inventors have been studied intensively to develop PVA that is useful in order to produce an ink jet recording material, thermal paper, release paper base paper, greaseproof paper, a film, and the like. As a result, they have found that it is possible to produce: an ink jet recording material that has few cracks in a coating film surface and is also excellent in ink absorbency; release paper base paper that is excellent in filling properties, grease resistance, and waterproofness; greaseproof paper that is excellent in grease resistance and waterproofness; a film having high strength and high stretching properties; and the like, using specific POA modified PVA to complete the present invention.

That is, the present invention is a POA modified PVA comprising a POA group in a side chain,
wherein the POA modified PVA has a viscosity average degree of polymerization of not less than 150 and not more than 5000, a degree of saponification of not less than 40 mol % and not more than 99.99 mol %, and a POA group modification rate of not less than 0.05 mol % and not more than 10 mol %; and the POA group is composed of a polyoxypropylene block and a (poly)oxyethylene block and is represented by the following general formula (I),

[chem. 1]

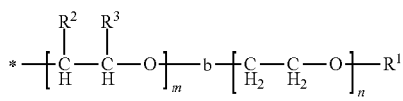

(I)

(in the general formula (I), $R^1$ denotes a hydrogen atom or an alkyl group having a carbon number of from 1 to 8; either one of $R^2$ and $R^3$ is a methyl group and the other is a hydrogen atom; and $10 \leq m \leq 40$ and $1 \leq n \leq 50$).

At this time, it is preferred that, when measuring viscosity of an aqueous 4 mass % solution of the POA modified PVA with a BL type viscometer in the condition of a rotation speed of a rotor at 6 rpm, a ratio $\eta_2/\eta_1$ of viscosity $\eta_2$ at 60° C. to viscosity at 20° C. is 2.0 or more.

In addition, the present invention is an aqueous solution comprising the POA modified PVA.

Further, the present invention is a method of producing the POA modified PVA, comprising: copolymerizing an unsaturated monomer represented by the following general formula (II) and a vinyl ester-based monomer; and saponifying a POA modified vinyl ester-based polymer thus obtained,

[chem. 2]

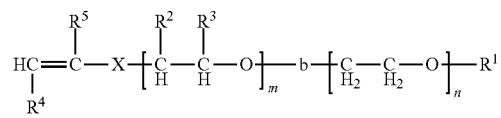

(II)

(in the general formula (II), $R^2$, $R^3$, m, and n are same as those in the general formula (I); $R^4$ denotes a hydrogen atom or a —COOM group, where M denotes a hydrogen atom, an alkali metal, or an ammonium group; $R^5$ denotes a hydrogen atom, a methyl group, or a —CH$_2$—COOM group, where M is same as the definition above; and X denotes —O—, —CH$_2$—O—, —CO—, —(CH$_2$)$_k$—, —CO—O—, or —CO—NR$^6$—, where $R^6$ denotes a hydrogen atom or an alkyl group having a carbon number of from 1 to 4 and $1 \leq k \leq 15$).

A preferred embodiment of the present invention is a coating agent comprising the POA modified PVA. A coated article wherein the coating agent is coated on a surface of a substrate is also a preferred embodiment of the present invention, and a method of producing the coated article, comprising coating the coating agent on the surface of the substrate having previously adjusted temperature of not less than 50° C. and not more than 100° C. is also a preferred embodiment of the present invention. An ink jet recording material wherein the coating agent is coated on a surface of a substrate is also a preferred embodiment of the present invention.

Thermal paper comprising the POA modified PVA is also a preferred embodiment of the present invention. Release paper base paper comprising the POA modified PVA is also a preferred embodiment of the present invention. At this time, it is more preferred that the release paper base paper has a paper substrate and a coating layer formed on a surface of the paper substrate, and the coating layer contains the POA modified PVA. Here, a method of producing release paper base paper, comprising coating the coating agent on a paper substrate is also a preferred embodiment of the present invention. At this time, it is more preferred that viscosity of the coating agent is not less than 10 mPa·s and not more than 3000 mPa·s. Release paper comprising the release paper base paper and a release layer formed on a surface of the release paper base paper is also a preferred embodiment of the present invention, and a laminate comprising the release paper base paper, a release layer formed on a surface of the release paper base paper, and an adhesive layer formed on a surface of the release layer is also a preferred embodiment of the present invention.

Greaseproof paper comprising the POA modified PVA is also a preferred embodiment of the present invention. At this time, it is more preferred that the greaseproof paper has a paper substrate and a coating layer formed on a surface of the paper substrate, and the coating layer contains the POA modified PVA, and it is even more preferred that weight of the coating layer per unit area is not less than 0.2 g/m² and not more than 20 g/m². A method of producing greaseproof paper comprising coating the coating agent on a surface of a paper substrate is also a preferred embodiment of the present invention.

A film comprising the POA modified PVA is also a preferred embodiment of the present invention. A method of producing the film, comprising forming a film using a solution containing the POA modified PVA is also a preferred embodiment of the present invention.

Effects of the Invention

POA modified PVA of the present invention is excellent in temperature-sensitive thickening properties, which are properties that, in a case that a temperature of an aqueous solution thereof is higher than room temperature, aqueous solution viscosity thereof becomes higher compared with the case of room temperature. That is, when an aqueous solution containing POA modified PVA is heated, its viscosity greatly rises. Therefore, a coated article and an ink jet recording material wherein the coating agent containing POA modified PVA of the present invention is coated on a surface of a substrate have few cracks due to drying of a coating layer, and moreover, are excellent in ink absorbency. According to a method of producing POA modified PVA of the present invention, it is possible to conveniently produce the POA modified PVA. According to a method of producing an ink jet recording material of the present invention, it is possible to conveniently produce the ink jet recording material. Release paper base paper of the present invention is excellent in filling properties, grease resistance, and waterproofness by containing the POA modified PVA. Accordingly, release paper and a laminate prepared using the release paper base paper have excellent release properties. According to a method of producing release paper base paper of the present invention, it is possible to conveniently produce the release paper base paper. Greaseproof paper of the present invention is excellent in grease resistance and waterproofness by containing the POA modified PVA. According to a method of producing greaseproof paper of the present invention, it is possible to conveniently produce the greaseproof paper. A film of the present invention has high strength and high stretching properties by containing the POA modified PVA. According to a method of producing a film of the present invention, it is possible to conveniently produce the film.

MODE FOR CARRYING OUT THE INVENTION

<Polyoxyalkylene Modified Vinyl Alcohol-Based Polymer>

A polyoxyalkylene modified vinyl alcohol-based polymer of the present invention (hereinafter, polyoxyalkylene may be abbreviated as "POA", and a vinyl alcohol-based polymer may be abbreviated as "PVA") comprises a polyoxyalkylene group in a side chain, wherein the polymer has a viscosity average degree of polymerization of not less than 150 and not more than 5000, a degree of saponification of not less than 40 mol % and not more than 99.99 mol %, and a polyoxyalkylene group modification rate of not less than 0.05 mol % and not more than 10 mol %; and the polyoxyalkylene group is composed of a polyoxypropylene block and a (poly)oxyethylene block and is represented by the following general formula (I).

[chem. 3]

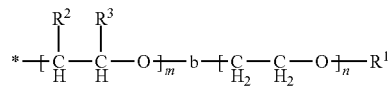

(I)

In the general formula (I), $R^1$ denotes a hydrogen atom or an alkyl group having a carbon number of from 1 to 8; either one of $R^2$ and $R^3$ is a methyl group and the other is a hydrogen atom; and $10 \leq m \leq 40$ and $1 \leq n \leq 50$.

The POA modified PVA is a copolymer that contains a monomer unit containing a POA group in a side chain, wherein the POA group is composed of a polyoxypropylene block and a (poly)oxyethylene block and is represented by the above general formula (I), a vinyl alcohol unit (—CH₂—CHOH—), and a vinyl ester unit. The POA modified PVA may also have other monomer units further without impairing the spirit of the present invention. It is preferred that the content of other monomers is not more than 10 mol % based on the mole number of the total monomer units in the POA modified PVA.

The POA group contained by the POA modified PVA of the present invention in side chain and represented by the general formula (I) is composed of a polyoxypropylene block where a number of repeating oxypropylene units is m and a (poly)oxyethylene block where a number of repeating oxyethylene units is n, and has the (poly)oxyethylene block arranged on the end side in the POA group. Here, in a case that n is 1, the POA group is composed of a polyoxypropylene block an oxyethylene block; and in a case that n is 2 or more, the POA group is composed of a polyoxypropylene block and a polyoxyethylene block. The POA group has such structure, thereby develops following properties caused by the interaction between the POA groups: excellent temperature-sensitive thickening properties; excellent filling properties, grease resistance, and waterproofness in the release paper base paper; excellent grease resistance and waterproofness in the greaseproof paper; and high strength and high stretching properties in the film. Although details of the mechanism at this time are not yet clear, it is considered as described later that the polyoxyethylene block, which is relatively hydrophilic, is on the end side in the POA group, thereby promoting the hydrophobic interaction of the POA groups between the POA modified PVA molecules to produce strong intermolecular crosslink, so that these effects are exhibited. It is also considered that the intermolecular crosslink is produced as the above description, thereby suppressing permeation of the POA modified PVA to the paper substrate when producing greaseproof paper and sufficiently developing grease resistance even with a small amount of coating, so that production efficiency becomes high.

The number m of repeating oxypropylene units in the POA group represented by the above general formula (I) has to be $10 \leq m \leq 40$, preferably $15 \leq m \leq 38$, and more preferably $20 \leq m \leq 35$. In a case of m being less than 10, the temperature-sensitive thickening properties caused by the interaction between the POA groups do not occur sufficiently. In addition, filling properties of the release paper base paper, and waterproofness and grease resistance of the greaseproof paper do not occur sufficiently. Further, strength of the film decreases.

The number n of repeating oxyethylene units has to be $1 \leq n \leq 50$, preferably $3 \leq n \leq 40$, and more preferably $5 \leq n \leq 10$. In a case of n being less than 1, temperature-sensitive thickening properties caused by the interaction between the POA groups do not occur sufficiently. In addition, since the interaction between the POA groups is insufficient, grease resistance in the release paper base paper and the greaseproof paper do not occur sufficiently. Further, strength of the film decreases. Meanwhile, in a case of n exceeding 50, the interaction between the POA groups does not occur sufficiently. In addition, filling properties and grease resistance of the release paper base paper, and grease resistance of the greaseproof paper do not occur, and moreover, strength of the film decrease.

$R^1$ in the POA group represented by the general formula (I) is a hydrogen atom or an alkyl group having a carbon number of from 1 to 8. $R^1$ is preferably a hydrogen atom, a methyl group, an ethyl group, or a butyl group, more preferably a hydrogen atom, a methyl group, or a butyl group, and even more preferably a hydrogen atom or a methyl group.

Either one of $R^2$ and $R^3$ in the POA group represented by the general formula (I) is a methyl group and the other is a hydrogen atom. At this time, for ease of producing the POA modified PVA, it is preferred that $R^2$ is a methyl group and $R^3$ is a hydrogen atom.

A method of producing the POA modified PVA of the present invention is not particularly limited. A method is preferred that copolymerizes an unsaturated monomer having a POA group represented by the above general formula (I), wherein the polyoxyalkylene group is composed of a polyoxypropylene block and a (poly)oxyethylene block, and a vinyl ester-based monomer and saponifies a POA modified vinyl ester-based copolymer thus obtained.

Here, as the unsaturated monomer, an unsaturated monomer represented by the following general formula (II) is preferred. Accordingly, as the method of producing POA modified PVA, a method is more preferred that copolymerizes an unsaturated monomer represented by the following general formula (II) and having a POA group represented by the above general formula (I), wherein the polyoxyalkylene group is composed of a polyoxypropylene block and a (poly)oxyethylene block, and a vinyl ester-based monomer and saponifies a POA modified vinyl ester-based copolymer thus obtained.

[chem. 4]

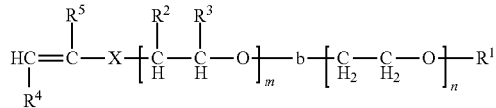

(II)

In the general formula (II), $R^1$, $R^2$, $R^3$, m, and n are same as those in the general formula (I). $R^4$ denotes a hydrogen atom or a —COOM group, where M denotes a hydrogen atom, an alkali metal, or an ammonium group. $R^5$ denotes a hydrogen atom, a methyl group, or a —$CH_2$—COOM group, where M is same as the definition above. Note that M in $R^4$ and M in $R^5$ may be either identical or different. X denotes —O—, —$CH_2$—O—, —CO—, —$(CH_2)_k$—, —CO—O—, or —CO—$NR^6$—. In a case that X is asymmetric, its orientation is not limited. Here, $R^6$ denotes a hydrogen atom or an alkyl group having a carbon number of from 1 to 4 and $1 \le k \le 15$.

X above is preferably —CO—NH—* or —$CH_2$—O—* and more preferably —CO—NH—*. Here, "*" is defined as the POA group side.

In the unsaturated monomer represented by the general formula (II), preferred exemplifications and numeric ranges for $R^1$, $R^2$, $R^3$, m, and n are same as those mentioned in the descriptions of the general formula (I), and particularly from the perspective of ease of synthesizing the unsaturated monomer represented by the general formula (II), it is preferred that $R^2$ is a methyl group and $R^3$ is a hydrogen atom.

In the unsaturated monomer represented by the general formula (II), it is also preferred that $R^1$ is a hydrogen atom or a methyl group, $R^4$ is a hydrogen atom, and $R^5$ is a hydrogen atom or a methyl group.

In a case that $R^1$ is a hydrogen atom, $R^4$ is a hydrogen atom, and $R^5$ is a hydrogen atom or a methyl group in the general formula (II), the unsaturated monomer represented by the general formula (II) may include polyoxyalkylene mono(meth)acrylamide, polyoxyalkylene mono(meth)allyl ether, polyoxyalkylene monovinyl ether, polyoxyalkylene mono(meth)acrylate, and the like, and may specifically include polyoxypropylene(poly)oxyethylene monoacrylamide, polyoxypropylene(poly)oxyethylene monomethacrylamide, polyoxypropylene(poly)oxyethylene monoallyl ether, polyoxypropylene(poly)oxyethylene monomethallyl ether, polyoxypropylene(poly)oxyethylene monovinyl ether, polyoxypropylene(poly)oxyethylene monoacrylate, polyoxypropylene(poly)oxyethylene monomethacrylate, and the like.

Among all, polyoxypropylene(poly)oxyethylene monoacrylamide, polyoxypropylene(poly)oxyethylene monomethacrylamide, polyoxypropylene(poly)oxyethylene monovinyl ether, and polyoxypropylene(poly)oxyethylene monoallyl ether are used preferably. Here, in a case of using the POA modified PVA for production of an ink jet recording material, polyoxypropylene(poly)oxyethylene monoacrylamide, polyoxypropylene(poly)oxyethylene monomethacrylamide, and polyoxypropylene(poly)oxyethylene monovinyl ether are used more preferably, and polyoxypropylene(poly)oxyethylene monomethacrylamide and polyoxypropylene(poly)oxyethylene monovinyl ether are used even more preferably. In a case of using the POA modified PVA for production of release paper base paper or greaseproof paper, polyoxypropylene(poly)oxyethylene monoacrylamide, polyoxypropylene(poly)oxyethylene monomethacrylamide, and polyoxypropylene(poly)oxyethylene monoallyl ether are used more preferably, and polyoxypropylene(poly)oxyethylene monomethacrylamide and polyoxypropylene(poly)oxyethylene monoallyl ether are used even more preferably. In a case of using the POA modified PVA for production of a film, polyoxypropylene(poly)oxyethylene monomethacrylamide, polyoxypropylene(poly)oxyethylene monovinyl ether, and polyoxypropylene(poly)oxyethylene monoallyl ether are used more preferably.

In a case of $R^1$ in the above general formula (II) being an alkyl group having a carbon number of from 1 to 8, the unsaturated monomer represented by the general formula (II) may specifically include the above unsaturated monomers, exemplified in the case of $R^1$ in the general formula (II) being a hydrogen atom, in which a hydroxyl group at an end is substituted with an alkoxy group having a carbon number of from 1 to 8. Among all, the unsaturated monomers of polyoxypropylene(poly)oxyethylene monomethacrylamide, polyoxypropylene(poly)oxyethylene monoallyl ether, and polyoxypropylene(poly)oxyethylene monovinyl ether in which a hydroxyl group at an end is substituted with a methoxy group are used preferably. Here, in a case of using the POA modified PVA for production of an ink jet recording material, the unsaturated monomers of polyoxypropylene(poly)oxyethylene monomethacrylamide and polyoxypropylene(poly)oxyethylene monovinyl ether in which a hydroxyl group at an end is substituted with a methoxy group are used more preferably. In a case of using the POA modified PVA for production of release paper base paper, greaseproof paper, or a film, the unsaturated monomers of polyoxypropylene(poly) oxyethylene monomethacrylamide and polyoxypropylene(poly)oxyethylene monoallyl ether in which a hydroxyl group at an end is substituted with a methoxy group are used more preferably. The unsaturated monomer of polyoxypropylene (poly)oxyethylene monomethacrylamide in which a hydroxyl group at an end is substituted with a methoxy group are used particularly preferably.

Although the temperature when copolymerizing the unsaturated monomer represented by the general formula (II) and the vinyl ester-based monomer is not particularly limited, it is preferably not less than 0° C. and not more than 200° C., and more preferably not less than 30° C. and not more than 140° C. In a case of the temperature for copolymerization lower than 0° C., it is difficult to obtain a sufficient rate of polymerization. In a case of the temperature for polymerization higher than 200° C., it is difficult to obtain POA modified PVA having a POA group modification rate defined in the present invention. A method of controlling the temperature employed for copolymerization not less than 0° C. not more than 200° C. may include, for example, a method of balancing heat generation due to polymerization and heat release from a surface of a reactor by controlling the rate of polymerization and a method of controlling with an external jacket using an appropriate heating medium, and the latter method is preferred from the perspective of safety.

The mode of polymerization employed for copolymerizing an unsaturated monomer represented by the above general formula (II) and a vinyl ester-based monomer may be any of batch polymerization, semi-batch polymerization, continuous polymerization, and semi-continuous polymerization. For the method of polymerization, it is possible to employ an arbitrary method from known methods, such as a bulk polymerization method, a solution polymerization method, a suspension polymerization method, and an emulsion polymerization method. Among them, a bulk polymerization method and a solution polymerization method, in which polymerization is carried out without solvent or in the presence of an alcohol-based solvent, is preferably employed. In a case of being intended to produce a copolymer with a high degree of polymerization, an emulsion polymerization method is employed. Although an alcohol-based solvent used for a bulk polymerization method or a solution polymerization method may employ methanol, ethanol, n-propanol, and the like, it is not limited to them. These solvents can also be used in combination of two or more types.

As an initiator used for copolymerization, a conventionally known azo initiator, a peroxide initiator, a redox initiator, or the like may be selected appropriately depending on the method of polymerization. The azo initiator may include 2,2'-azobisisobutyronitrile, 2,2'-azobis(2,4-dimethylvaleronitrile), and 2,2'-azobis(4-methoxy-2,4-dimethylvaleronitrile), and the peroxide initiator may include percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy decanoate; acetylcyclohexylsulfonyl peroxide; and 2,4,4-trimethylpentyl-2-peroxyphenoxyacetate. Further, it is also possible to make the initiator by combining potassium persulfate, ammonium persulfate, hydrogen peroxide, and the like with the initiators mentioned above. The redox initiator may include combinations of the peroxides mentioned above with a reducing agent, such as sodium hydrogen sulfite, sodium hydrogen carbonate, tartaric acid, L-ascorbic acid, and rongalite.

In a case of copolymerizing an unsaturated monomer represented by the general formula (II) and a vinyl ester-based monomer at a high temperature, coloring or the like may be appeared in POA modified PVA caused by decomposition of the vinyl ester-based monomer. There is no objection to add approximately not less than 1 ppm and not more than 100 ppm (with respect to the mass of the vinyl ester-based monomer) of an antioxidant, such as tartaric acid, to the polymerization system for the purpose of prevention of the coloring in that case.

The vinyl ester-based monomer used for the copolymerization may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, and the like. Among all, vinyl acetate is most preferred.

Upon copolymerization of the unsaturated monomer represented by the above general formula (II) and the vinyl ester-based monomer, another monomer may also be copolymerized without impairing the spirit of the present invention. The monomer allowed for use may include, for example, α-olefins, such as ethylene, propylene, n-butene, and isobutylene; acrylic acid and salts thereof; acrylic esters; methacrylic acid and salts thereof; methacrylic esters; acrylamide; acrylamide derivatives, such as N-methylacrylamide, N-ethylacrylamide, N,N-dimethylacrylamide, diacetoneacrylamide, acrylamide propane sulfonic acid and salts thereof, acrylamidopropyl dimethylamine and salts thereof or quaternary salts thereof, and N-methylolacrylamide and derivatives thereof; methacrylamide; methacrylamide derivatives, such as N-methylmethacrylamide, N-ethylmethacrylamide, methacrylamide propane sulfonic acid and salts thereof, methacrylamidopropyl dimethylamine and salts thereof or quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilyl compounds, such as vinyltrimethoxysilane; and isopropenyl acetates.

In addition, upon copolymerization of the unsaturated monomer represented by the above general formula (II) and the vinyl ester-based monomer, copolymerization may also be carried out in the presence of a chain transfer agent for the purposes of adjusting the degree of polymerization of the POA modified vinyl ester-based copolymer to be obtained and the like without impairing the spirit of the present invention. The chain transfer agent may include aldehydes, such as acetaldehyde and propionaldehyde; ketones, such as acetone and methylethylketone; mercaptans, such as 2-hydroxyethanethiol; hydrocarbon halides, such as trichloroethylene and perchloroethylene; and phosphinates, such as sodium phosphinate monohydrate, and among all, aldehydes and ketones are used preferably. Although an amount of adding the chain transfer agent may be determined depending on the chain transfer constant of the chain transfer agent to be added and the intended degree of polymerization of the POA modified vinyl ester-based polymer, it is desirably not less than 0.1 mass % not more than 10 mass % with respect to the vinyl ester-based monomer in general.

To the saponification reaction of a POA modified vinyl ester-based polymer, a conventionally known alcoholysis reaction or hydrolysis reaction using a basic catalyst, such as sodium hydroxide, potassium hydroxide, and sodium methoxide, or an acidic catalyst, such as p-toluenesulfonic acid, can be applied. The solvent allowed for use in this reaction may include alcohols, such as methanol and ethanol; esters, such as methyl acetate and ethyl acetate; ketones, such as acetone and methylethylketone; and aromatic hydrocarbons, such as benzene and toluene, and they can be used singly or in combination with two or more types. Among all, it is convenient and preferred to carry out a saponification reaction using methanol or a mixed solution of methanol/methyl acetate as a solvent and sodium hydroxide as a catalyst.

The POA modified PVA of the present invention has to have a POA group modification rate of not less than 0.05 mol % and not more than 10 mol %, preferably not less than 0.05 mol % and not more than 5 mol %, more preferably not less than 0.1 mol % and not more than 2 mol %, and even more preferably not less than 0.15 mol % and not more than 1.5 mol %. When the POA group modification rate exceeds 10 mol %, the proportion of POA groups contained per POA modified PVA molecule becomes high, and thus the water solubility of the POA modified PVA decreases. Therefore, temperature-sensitive thickening properties in a high concentration aqueous solution do not occur sufficiently, and moreover, strength and stretching properties of a film thus obtained decrease. In addition, the proportion of the POA groups becomes high, and thus when producing release paper base paper or greaseproof paper using a coating agent containing the POA modified PVA, the viscosity of the coating agent at high temperatures becomes excessively high, which is prone to cause unevenness while coating. In a case of causing such unevenness, waterproofness of release paper base paper and greaseproof paper to be obtained does not occur sufficiently.

Meanwhile, in a case that the POA group modification rate is less than 0.05 mol %, the proportion of POA groups contained per POA modified PVA molecule is less, so that temperature-sensitive thickening properties caused by the interaction between the POA groups and grease resistance and waterproofness of the greaseproof paper caused by the interaction between the POA groups do not occur sufficiently. In addition, the proportion of POA groups is less, so that filling properties, grease resistance, and waterproofness of the release paper base paper do not occur sufficiently, and moreover, strength of the film decrease. The POA group modification rate is a proportion (mol %) of a mole number of the POA groups contained in side chain of the POA modified PVA and represented by the general formula (I) relative to a mole number of the total monomer units constituting the POA modified PVA. The POA group modification rate may be obtained from the POA modified PVA and may also be obtained from a POA modified vinyl ester-based polymer, which is a precursor thereof, and both can be obtained from the proton NMR.

For example, in a case that the POA modified PVA is composed only of a vinyl alcohol unit, a vinyl acetate unit, and a polyoxypropylene(poly)oxyethylene monomethacrylamide unit as a unit of the unsaturated monomer represented by the above general formula (II), it is possible to calculate the POA group modification rate in the following method. That is, for example, in a case of obtaining from a POA modified vinyl ester-based polymer (POA modified polyvinyl acetate), which is a precursor, specifically, a POA modified vinyl ester-based polymer is firstly reprecipitation purified sufficiently using an n-hexane/acetone mixed solvent three times or more, followed by drying at 50° C. under reduced pressure for two days to produce a sample of a POA modified vinyl ester-based polymer for analysis. Next, the sample is dissolved in $CDCl_3$ to be measured at room temperature using a proton NMR. Then, the POA group modification rate is possible to be calculated from an area of a peak α (from 4.7 to 5.2 ppm) derived from protons of main chain methine in the vinyl ester-based monomer and an area of a peak β (from 0.8 to 1.0 ppm) derived from protons of a methyl group at an end of the oxypropylene unit using the following expression. In the expression, m denotes a number of repeating oxypropylene units.

POA Group Modification Rate (mol %)={(Area of Peak β/3 m)/(Area of Peak α+(Area of Peak (β/3 m))}×100

Even in a case that the POA modified PVA has a structure other than the above structure, it is possible to easily obtain the POA group modification rate by appropriately modifying the peaks subjected to the calculation or the calculation expression.

The viscosity average degree of polymerization (hereinafter, a viscosity average degree of polymerization may be referred to simply as a degree of polymerization) of the POA modified PVA has to be not less than 150 and not more than 5000. In a case of a degree of polymerization being less than 150, temperature-sensitive thickening properties, filling properties of the release paper base paper, and grease resistance and waterproofness of the greaseproof paper do not occur sufficiently, and moreover, strength and stretching properties of the film decrease. The degree of polymerization is preferably 200 or more, more preferably 500 or more, even more preferably 1000 or more, particularly preferably 1500 or more, and most preferably 2000 or more. When the degree of polymerization exceeds 5000, productivity of the POA modified PVA decreases and it becomes not practical. The degree of polymerization is preferably 4000 or less, more preferably 3500 or less, and even more preferably 3000 or less.

The viscosity average degree of polymerization of POA modified PVA is measured according to JIS-K6726. That is, it is obtained by the following expression from limiting viscosity [η] (unit: deciliter/g) measured in water at 30° C., after resaponifying and purifying the POA modified PVA.

Viscosity Average Degree of Polymerization=$([\eta] \times 10^3/8.29)^{(1/0.62)}$ The degree of saponification of the POA modified PVA has to be not less than 40 mol % and not more than 99.99 mol %, is preferably not less than 50 mol % and not more than 99.9 mol %, and is more preferably not less than 60 mol % and not more than 99 mol %. In a case of the degree of saponification being less than 40 mol %, the water solubility of the POA modified PVA decreases and temperature-sensitive thickening properties do not occur sufficiently. In addition, solubility of the POA modified PVA decreases, which makes it difficult to produce a film. Further, grease resistance of release paper base paper or greaseproof paper to be obtained does not occur sufficiently. Meanwhile, when the degree of saponification exceeds 99.99 mol %, production of the POA modified PVA becomes difficult, so that it is not practical. In a case of using the POA modified PVA for release paper base paper or greaseproof paper, the degree of saponification is preferably not less than 60 mol % and not more than 99.99 mol %, more preferably not less than 70 mol % and not more than 99.5 mol %, and even more preferably not less than 80 mol % and not more than 99 mol %. The degree of saponification of the POA modified PVA is a value obtained by being measured according to JIS-K6726.

When measuring the viscosity of an aqueous 4 mass % solution of the POA modified PVA with a BL type viscometer in the condition of the rotation speed of the rotor at 6 rpm, it is preferred that a ratio $\eta_2/\eta_1$ of viscosity $\eta_2$ at 60° C. to viscosity at 20° C. is 2.0 or more. The viscosity ratio $\eta_2/\eta_1$ is more preferably 5.0 or more, even more preferably 10 or more, and particularly preferably 100 or more. In a case of the viscosity ratio $\eta_2/\eta_1$ of less than 2.0, when using the POA modified PVA as an ink jet recording material, there is a case the interaction between the POA groups is less and the physical properties accompanied by the POA modification may not occur sufficiently and thus the temperature-sensitive thickening properties may not be utilized. Although the upper limit of the viscosity ratio $\eta_2/\eta_1$ is not particularly limited, it is preferably 2000 or less and more preferably 1000 or less.

<Aqueous Solution Containing POA Modified PVA>

Utilizing the viscosity behavior of the aqueous solution containing the POA modified PVA of the present invention relative to the above temperature changes, it is possible to preferably use the aqueous solution in a wide range of fields. Although a content of the POA modified PVA in the aqueous solution is not particularly limited, it is preferably not less than 1 mass % and not more than 20 mass %. In a case of the POA modified PVA content being less than 1 mass %, there is a risk that the temperature-sensitive thickening properties do not occur sufficiently. In addition, in a case of evaporating water in the aqueous solution, there is a case that it takes long time to evaporate water and the workability decreases. The POA modified PVA content is more preferably 2 mass % or more.

<Coating Agent>

The POA modified PVA of the present invention is used preferably for a coating agent utilizing viscosity behavior and the like of an aqueous solution containing the same relative to temperature changes. A coating agent of the present invention is not particularly limited as long as it contains POA modified PVA while it is preferably a solution in which the POA modified PVA is dissolved in a liquid medium. It is possible to prepare the coating agent by dissolving the POA modified PVA in the liquid medium. As the liquid medium, it is preferred to use water, or a mixture of water and an organic solvent. It is more preferred that the liquid medium is water, that is, the coating agent is an aqueous solution containing the POA modified PVA.

The organic solvent used for the liquid solvent may include: alcohol-based solvents, such as methanol and ethanol; ester-based solvents, such as methyl acetate and ethyl acetate; ether-based solvents, such as diethyl ether, 1,4-dioxane, cellosolve, and MTBE (methyl-t-butyl ether); ketone-based solvents, such as acetone and diethyl ketone; glycol-based solvents, such as ethylene glycol, propylene glycol, diethylene glycol, and triethylene glycol; glycol ether-based solvents, such as diethylene glycol monomethyl ether, triethylene glycol monomethyl ether, propylene glycol monomethyl ether, and 3-methoxy-3-methyl-1-butanol; glycol ester-based solvents, such as ethylene glycol monomethyl ether acetate, PMA (propylene glycol monomethyl ether acetate), diethylene glycol monobutyl ether acetate, and diethylene glycol monoethyl ether acetate; and the like. A mixing ratio of the water to the organic solvent in the mixture, water:organic solvent (mass ratio), is preferably in a range of from 50:50 to 100:0, and the coating agent is more preferably an aqueous solution.

The POA modified PVA content in a coating agent in a case that the coating agent is a solution containing POA modified PVA is not particularly limited and is selected arbitrarily depending on the amount of coating (increased amount in dry mass of the substrate caused by coating), the device used for coating, the operating conditions, and the like whereas it is preferably not less than 1 mass % and not more than 20 mass %, more preferably not less than 1 mass % and not more than 15 mass %, and even more preferably not less than 2 mass % and not more than 10 mass %.

The coating agent of the present invention may also be a dispersion, and a dispersoid content in that case is preferably not less than 5 mass % and not more than 50 mass %. The dispersion medium in this case is preferably a solution in which the POA modified PVA described above is dissolved in the liquid medium. The POA modified PVA content in the dispersion medium is preferably in the amount described above as the POA modified PVA content in the solution containing the POA modified PVA.

The coating agent of the present invention may further contain components other than the POA modified PVA, the water, and the organic solvent without impairing the spirit of the present invention. Such other components may include various polymers (water soluble polymers, polymer dispersions, and the like), fillers, waterproofing agents, surfactants (nonionic, anionic, and the like), lubricants, antifoamers, dispersants, wetting agents, pH adjusters, ultraviolet absorbers, and the like.

<Coated Article and Ink Jet Recording Material>

A coated article wherein the coating agent containing the POA modified PVA is coated on a surface of a substrate is also a preferred embodiment of the present invention.

Although the type of the coated article is not particularly limited, it may include, as described later, an ink jet recording material, release paper base paper wherein the base paper has a paper substrate and a coating layer formed on a surface of the paper substrate, and the coating layer contains the polyoxyalkylene modified vinyl alcohol-based polymer, greaseproof paper wherein the greaseproof paper has a paper substrate and a coating layer formed on a surface of the paper substrate, and the coating layer contains the polyoxyalkylene modified vinyl alcohol-based polymer, and the like.

Although the method of producing the coated article is not particularly limited, it is preferably a method comprising coating the coating agent on the surface of the substrate having previously adjusted temperature of not less than 50° C. and not more than 100° C.

The coating agent containing the POA modified PVA is preferably used for producing an ink jet recording material, and an ink jet recording material wherein the coating agent is coated on a surface of a substrate is also a preferred embodiment of the present invention.

In a case that the coating agent containing the POA modified PVA is coated on a surface of a substrate, thereby forming an ink receiving layer on a surface of a substrate to produce an ink jet recording material, the POA modified PVA is capable of functioning as a binder for filler in the ink receiving layer of the ink jet recording material. In a case that the POA modified PVA of the present invention functions as a binder, the ink receiving layer thus formed has few cracks. Accordingly, it is possible to preferably use the coating agent for producing a high gloss ink jet recording material.

In a case of using the coating agent for producing an ink jet recording material, the POA modified PVA may be used singly or may also be used in combination with other water soluble polymers or water dispersible polymers. The water soluble polymers allowed to be used in combination with the POA modified PVA may include cellulose derivatives, such as methyl cellulose, hydroxyethyl cellulose, hydroxypropyl methyl cellulose, and carboxymethyl cellulose (CMC), albumin, gelatin, casein, starch, cationized starch, gum arabic, poly(meth)acrylamide, polyvinylpyrrolidone, sodium poly (meth)acrylate, unmodified PVA, anion modified PVA, sodium alginate, water soluble polyester resins, water soluble polyamide resins, water soluble melamine resins, and the like. The water dispersible polymers allowed to be used in combination with the POA modified PVA may include styrene-butadiene copolymers, nitrile-butadiene copolymers, vinyl acetate-based polymers, ethylene-vinyl acetate copolymers, (meth)acrylate-based polymers, vinyl chloride-based polymers, and the like.

It is preferred that the coating agent used for producing an ink jet recording material further contains filler. Using such coating agent causes an ink receiving layer to contain the filler.

Although an average particle diameter of the filler is not particularly limited, it is preferably not less than 30 nm and not more than 400 nm, and more preferably not less than 80 nm and not more than 400 nm. In a case of the average particle diameter being less than 30 nm, it may be difficult to form capillaries in the ink receiving layer, so that there is a case of decreasing the ink absorbency of the ink jet recording material. When the average particle diameter exceeds 400 nm, there is a case of decreasing the glossiness of the ink receiving layer surface. Here, it is possible to measure the average particle diameter of the filler using a laser diffraction/scattering type particle size distribution measuring device (LA-910, manufactured by Horiba, Ltd.).

As the filler, any of inorganic microparticles and organic microparticles is used. Such inorganic microparticles may include precipitated silica, gelatinous silica, colloidal silica, gas phase silica, colloidal alumina, alumina sol, aluminum oxide microparticles, particulate titanium oxide, particulate zinc oxide, aluminum hydroxide, pseudo-boehmite, clay, talc, kieselguhr, zeolite, calcium carbonate, satin white, and the like, and among them, colloidal silica, gas phase silica, alumina sol, and aluminum oxide microparticles are used preferably. Meanwhile, the organic microparticles may include microparticles of organic pigments, polystyrene resins polyacrylic resins, styrene/acryl copolymer resins, and the like.

Colloidal silica refers to amorphous silica particles that are dispersed in water colloidally. As colloidal silica for filler, it is possible to use in general those having surface charge negatively charged. Further, those having positive charge given by surface treatment, such as a silane coupling agent, or aggregate thereof are also used preferably as filler.

Gas phase silica is silicon dioxide obtained from a volatile silane compound. Gas phase silica is composed of spherical primary particles usually having an average particle diameter of tens of nm and these primary particles aggregate to form secondary aggregate. Microparticles having an average particle diameter of not less than 30 nm and not more than 400 nm obtained by pulverizing the secondary aggregate with pulverizing means, such as a bead mill, a homogenizer, an ultrasonic homogenizer, and a high pressure homogenizer are used preferably as the filler. As such gas phase silica, it is possible to use in general those having surface charge negatively charged. Further, those having positive charge given by surface treatment are also used preferably.

As the aluminum oxide microparticles for filler, aluminum oxide microparticles in a γ crystal form are used. Aluminum oxide in a γ crystal form may have primary particles with a small average particle diameter down to approximately 10 nm. In the powder of aluminum oxide, primary particles generally form secondary aggregate. The secondary aggregate usually has a particle diameter in several μm order. Microparticles having an average particle diameter of not less than 30 nm and not more than 400 nm obtained by pulverizing the secondary aggregate with pulverizing means, such as a bead mill, a homogenizer, an ultrasonic homogenizer, and a high pressure homogenizer are used preferably as the filler.

In the coating agent containing the filler, although a mass ratio of POA modified PVA/filler is not particularly limited, the mass ratio of POA modified PVA/filler is preferably not less than 3/97 and not more than 50/50, more preferably not less than 5/95 and not more than 40/60, and even more preferably not less than 8/92 and not more than 30/70. In a case of the mass ratio of POA modified PVA/filler being less than 3/97, there is a case of not being possible to obtain an ink receiving layer having sufficient strength. In a case of the mass ratio of POA modified PVA/filler being larger than 50/50, there is a case that formation of the capillaries required for ink absorbency becomes difficult, which makes the ink absorbency to be poor.

The coating agent used for producing an ink jet recording material may also contain a cationic monomer, oligomer, or polymer as a fixing agent for the ink. Those allowed for use for this purpose are preferably a monomer, an oligomer, or a polymer having primary through tertiary amine or quaternary ammonium salt dissociating when dissolved in water to exhibit cationic properties, and among them, an oligomer or a polymer is preferred. Specific examples of the fixing agent are a dimethylamine-epichlorohydrin polycondensate, an acrylamide-diallylamine copolymer, a polyvinylamine copolymer, a polyallylamine copolymer, a diallyldimethylammonium chloride copolymer, polyethyleneimine, and the like while they are not limited to these.

As a substrate used for producing the ink jet recording material, it is possible to use both transparent and non-transparent supporting bases that are conventionally known. The transparent supporting base may include a film, a sheet, and the like of polyester, polystyrene, polyvinyl chloride, polymethyl methacrylate, cellulose acetate, polycarbonate, polyimide, cellophane, celluloid, and the like, and highly transparent paper. The POA modified PVA in the ink receiving layer formed using the coating agent of the present invention has high transparency. Accordingly, using the coating agent of the present invention enables to obtain a highly transparent ink jet recording material. The non-transparent supporting base may include general paper, pigment coated paper (art paper, coated paper, cast-coated paper), fabric, wood, a metal plate, synthetic paper, synthetic resin-based film and sheet subjected to non-transparency treatment, and the like.

The method of producing an ink jet recording material by coating the coating agent containing the POA modified PVA of the present invention on a surface of a substrate may include a method comprising: preparing a coating agent by dissolving or dispersing the POA modified PVA and, as needed, filler, a fixing agent for the ink, and the like in an aqueous medium and coating the coating agent thus obtained on a surface of a substrate using a size press, an air knife coater, a roll coater, a bar coater, a blade coater, a curtain coater, a cast coater, and the like that are conventionally known. Here, although the coating temperature (temperature of the coating agent) is not particularly limited, it is preferably not less than 10° C. and not more than 60° C., more preferably not less than 15° C. and not more than 50° C., and even more preferably not less than 20° C. and not more than 40° C. In a case that the substrate is paper, it is also possible to employ a method comprising internally adding the aqueous solution or an aqueous dispersion when making paper.

In a case of producing an ink jet recording material by coating the coating agent containing the POA modified PVA of the present invention on a surface of a substrate, it is preferred that the coating agent on a surface of a substrate tempered in advance at a temperature of not less than 60° C. and not more than 100° C. The temperature of the surface of the substrate is more preferably not less than 60° C. and not more than 90° C., and even more preferably not less than 60° C. and not more than 80° C. The temperature of the surface of the substrate is adjusted previously, thereby instantly thickening and gelating the coating agent to form a strong coating layer, and thus an ink jet recording material having few cracks due to drying of the coating layer and having very high glossiness is obtained.

The coating agent containing the POA modified PVA of the present invention is used for applications to form an ink receiving layer of an ink jet recording material, then crack prevention in the coating film only by drying at a temperature higher than the coating temperature (temperature of the coating agent) without cooling the coating film once after coating can be achieved. This enables to significantly improve the production rate, that is, productivity and to greatly save the utility costs, such as power consumption. Further, it is enabled to produce a high gloss ink jet recording material by a coating line that does not have ancillary facilities in a cooling zone.

Although the mechanism to develop such crack prevention performance is not yet clear, it is assumed as follows. In a low temperature state while coating, the POA group in the POA modified PVA is hydrated with water having a cluster structure and the hydrophobic interaction between the polyoxypropylene blocks is inhibited. In contrast, in a high temperature state after coating or while drying, the hydration of the polyoxypropylene block is removed and the polyoxypropylene blocks associate with each other by the hydrophobic interaction. Due to this phenomenon, the POA modified PVA in a high temperature state comes to a state of forming intermolecular crosslink due to the hydrophobic interaction between the polyoxypropylene blocks. Therefore, the coating agent containing the POA modified PVA is coated on a heated substrate surface, which causes a rise in viscosity, and further, evaporation of water in the drying process causes a rise in concentration, which causes gelation. A coating film thus obtained is considered to have a strong three dimensional structure and to become a film not easily cracking. Further, a structure having a polyoxyethylene block at an end portion in the POA group in the POA modified PVA of the present invention is considered to promote the hydrophobic interaction. Thus, the POA modified PVA of the present invention is considered to exhibit very excellent temperature-sensitive thickening properties. In the following Examples, it is confirmed that the POA modified PVA of the present invention exhibits greater temperature-sensitive thickening properties compared with POA modified PVA having a POA group composed only of polyoxypropylene blocks or POA modified PVA having an oxypropylene unit and an oxyethylene unit arranged randomly.

<Release Paper Base Paper>

Release paper base paper of the present invention contains the above POA modified PVA. Although the layer constitution of the release paper base paper is not limited, it is preferred that the base paper has a paper substrate and a coating layer formed on a surface of the paper substrate, and the coating layer contains the POA modified PVA. According to such release paper base paper, it is possible to more effectively enhance the filling properties, the grease resistance, and the waterproofness.

As the paper substrate, it is possible to use known paper or synthetic paper obtained by papermaking with chemical pulp, such as hardwood kraft pulp and softwood kraft pulp, mechanical pulp, such as GP (groundwood pulp), RGP (refiner groundwood pulp), and TMP (thermomechanical pulp), and the like. As the paper substrate, it is also possible to use wood free paper, wood containing paper, alkaline paper, glassine paper, semi-glassine paper, and the like, and semi-glassine paper is preferred. The paper substrate may also contain organic and inorganic pigment and papermaking aids, such as a paper strength additive, a sizing agent, and a retention aid.

Although the basis weight of the paper substrate is not particularly limited, it is preferably not less than 10 $g/m^2$ and not more than 120 $g/m^2$ and more preferably not less than 40 $g/m^2$ and not more than 100 $g/m^2$ considering the filling properties, the handling properties, and the like of the release paper base paper thus obtained.

It is possible to produce release paper base paper of the present invention by coating the coating agent on the paper substrate. Here, the coating agent may be coated on one side of the paper substrate or may also be coated on both sides.

The POA modified PVA content in the coating agent used for producing release paper base paper is not particularly limited and is selected arbitrarily depending on the amount of coating (increased amount in dry mass of the paper caused by coating), the device used for coating, the operating conditions, and the like whereas it is preferably not less than 1 mass % and not more than 15 mass % and more preferably not less than 2 mass % and not more than 10 mass %.

Upon producing the release paper base paper, the viscosity of the coating agent is not particularly limited, whereas the viscosity while coating is preferably not less than 10 mPa·s and not more than 3000 mPa·s, more preferably not less than 12 mPa·s and not more than 2000 mPa·s, and even more preferably not less than 15 mPa·s and not more than 1000 mPa·s. The viscosity of the coating agent falling within the above range makes the coating agent not to easily permeate inside the paper substrate and enables to easily form a coating layer having a sufficient thickness and less unevenness on a surface of the paper substrate, and as a result, the filling properties, the grease resistance, and the like are improved furthermore.

Upon producing the release paper base paper, the water soluble polymer and the polymer dispersion that may be contained in the coating agent may include: water soluble polymers, such as starch and derivatives thereof, cellulose derivatives like hydroxymethyl cellulose, hydroxyethyl cellulose, carboxymethyl cellulose, methyl cellulose, and ethyl cellulose, gum arabic, polyvinyl alcohol, alkali salt (like sodium salt) of polyacrylic acid, polyvinylpyrrolidone, a (meth)acrylamide-(meth)acrylic ester copolymer, a (meth)acrylamide-(meth)acrylic ester-(meth)acrylic acid terpolymer, alkali salt (like sodium salt) of a styrene-maleic anhydride copolymer, alkali salt (like sodium salt) of an isobutylene-maleic anhydride copolymer, alkali salt (like sodium salt) of a diisobutylene-maleic anhydride copolymer, polyacrylamide, sodium alginate, gelatin, and casein; emulsion of polyvinyl acetate, polyurethane, polyacrylic acid, polyacrylic ester, a vinyl chloride-vinyl acetate copolymer, polybutyl methacrylate, an ethylene-vinyl acetate copolymer, and the like, and latex of a styrene-butadiene copolymer, a styrene-butadiene-acrylic acid copolymer, and the like.

Upon producing the release paper base paper, the filler that may be contained in the coating agent may include kaolin, clay, calcium carbonate, baked clay, titanium oxide, kieselguhr, silica, colloidal silica, aluminum oxide, aluminum hydroxide, synthetic aluminum silicate, synthetic magnesium silicate, polystyrene microparticles, polyvinyl acetate-based microparticles, urea-formalin resin microparticles, wheat flour, and the like.

Upon producing the release paper base paper, the waterproofing agent that may be contained in the coating agent may include, for example, glyoxal, urea resins, melamine resins, polyvalent metal salt, water soluble polyamide resins, and the like.

The method of producing release paper base paper by coating the coating agent on a paper substrate is not particularly limited and may be carried out in a known method. As specific coating facilities, it is possible to use a 2 roll size press, a gate roll size press, a metering size press, an air knife coater, a bar coater, a roll coater, a blade coater, and the like.

Although the amount of coating the coating agent is not particularly limited, it is usually preferably not less than 0.05 g/m$^2$ and not more than 3 g/m$^2$ per side of the paper substrate with respect to solid content and more preferably not less than 0.1 g/m$^2$ and not more than 2 g/m$^2$. The amount of coating falling within the above range makes the filling properties, the grease resistance, and the waterproofness to be improved furthermore.

Here, although the coating temperature (temperature of the coating agent) is not particularly limited, it is preferably not less than 10° C. and not more than 60° C., more preferably not less than 15° C. and not more than 55° C., and even more preferably not less than 20° C. and not more than 40° C.

In a case of producing the release paper base paper by coating the coating agent on a paper substrate, it is preferred to coat the coating agent on the paper substrate having previously adjusted temperature of not less than 50° C. and not more than 100° C. The temperature of the paper substrate after adjusting is more preferably not less than 50° C. and not more than 90° C., and even more preferably not less than 50° C. and not more than 80° C. Adjusting the temperature of the paper substrate enables to instantly thicken the coating agent and to easily form a strong coating layer on a surface of the paper substrate, so that it is possible to efficiently obtain release paper base paper excellent in grease resistance, waterproofness, and the like.

Usually, after the coating of the coating agent, drying treatment is carried out. The drying treatment can be carried out by hot air, infrared rays, a heating cylinder, and a method combining them. The release paper base paper thus dried can be improved furthermore in the grease resistance by humidity conditioning and calender treatment. The humidification conditions are preferred in the condition of the water content in paper of from 5 to 20 mass %. The calender treatment conditions are preferred where the roll temperature is from ordinary temperature to 200° C. and the linear pressure of the rolls is from 20 to 350 kg/cm.

The release paper base paper may also have, other than the paper substrate and the coating layer, another layer and the like between the paper substrate and the coating layer, for example. The release paper base paper may also contain the POA modified PVA in the paper substrate. Even in such case, the release paper base paper is capable of exhibiting high filling properties and waterproofness.

<Release Paper>

Release paper of the present invention has the release paper base paper and a release layer formed on a surface of the release paper base paper. Examples of the release paper base paper may include those having a paper substrate and a coating layer formed on a surface of the paper substrate as described above, and in a case of forming a release layer on a surface of the coating layer in the release paper base paper, excellent performances of the release paper base paper of the present invention are exhibited more effectively. It is possible to obtain such release paper by coating a release agent to form the release layer on the release paper base paper as the varnish. The release agent may include solvent-based silicone, non-solvent-based (emulsion-based, oligomer-based) silicone, and the like. The solvent contained in the release agent may include organic solvents, such as toluene.

<Laminate>

A laminate of the present invention at least has the release paper base paper, a release layer formed on a surface of the release paper base paper, and an adhesive layer formed on a surface of the release layer. In the laminate, it is preferred that a substrate layer, such as a paper layer and a plastic layer, is further arranged on a surface of the adhesive layer opposite from the side making contact with the release layer. Such laminate is excellent in release properties between the release layer and the adhesive layer. It is possible to obtain such laminate by coating an adhesive to form the adhesive layer on the release layer in the release paper. The adhesive may include solvent-based adhesives and emulsion-based adhesives.

<Greaseproof Paper>

Greaseproof paper of the present invention contains the POA modified PVA. Although the layer constitution of the greaseproof paper is not limited, it is preferred that the greaseproof paper has a paper substrate and a coating layer formed on a surface of the paper substrate, and the coating layer contains the specific POA modified PVA. According to such greaseproof paper, it is possible to enhance production efficiency, grease resistance, and waterproofness more effectively.

As the paper substrate, it is possible to use known paper or synthetic paper obtained by papermaking with chemical pulp, such as hardwood kraft pulp and softwood kraft pulp, mechanical pulp, such as GP (groundwood pulp), RGP (refiner groundwood pulp), and TMP (thermomechanical pulp), and the like. As the paper substrate, it is also possible to use wood free paper, wood containing paper, alkaline paper, glassine paper, semi-glassine paper, board and white lined board used for corrugated boards, for building materials, for white lined chipboards, for chipboards, and the like. The paper substrate may also contain organic and inorganic pigment and papermaking aids, such as a paper strength additive, a sizing agent, and a retention aid. The paper substrate may also be subjected to various types of surface treatment.

Although the basis weight of the paper substrate is not particularly limited, it is preferably not less than 20 g/m$^2$ and not more than 150 g/m$^2$ to be used for wrapping paper and preferably not less than 150 g/m$^2$ and not more than 500 g/m$^2$ to be used for molded containers, such as boxes, considering the grease resistance and the like of the greaseproof paper thus obtained.

It is possible to produce the greaseproof paper of the present invention by, for example, coating the coating agent containing the POA modified PVA on a surface of the paper substrate. The greaseproof paper of the present invention thus obtained usually has a paper substrate and a coating layer formed on a surface of the paper substrate and the coating layer contains the POA modified PVA. Here, the surface of the paper substrate means at least one side of the paper substrate and may also mean both sides.

The POA modified PVA content in the coating agent used for producing greaseproof paper is not particularly limited and is selected arbitrarily depending on the amount of coating (increased amount in dry mass of the paper caused by coating), the device used for coating, the operating conditions, and the like whereas it is preferably not less than 1 mass % and not more than 15 mass % and more preferably not less than 2 mass % and not more than 10 mass %.

In a case of using the coating agent of the present invention for production of greaseproof paper, the coating agent may further contain a grease resistant agent other than the POA modified PVA. The greaseproof paper of the present invention is excellent in grease resistance because it contains the POA modified PVA whereas the grease resistance can be improved furthermore by containing another grease resistant agent. Such grease resistant agent may include PVA other than the POA modified PVA, acryl-based resins, polyester-based resins, polyurethane-based resins, styrene-butadiene-based resins, polyolefin-based resins, carboxymethyl cellulose-based resins, polyamide-based resins, starches, vinyl chloride-based resins, vinylidene chloride-based resins, silicone-based resins, mixtures of an acryl-based resin and wax, mixtures of a styrene-acryl-based resin and wax, and the like.

In a case of using the coating agent for production of greaseproof paper, from the perspective of giving various physical properties, such as suppressing blocking of the greaseproof paper with each other, to the greaseproof paper, the coating agent may further contain an inorganic-based or organic-based loading material. The inorganic-based loading material may include, for example, kaolin, synthetic mica, calcium carbonate, talc, calcium sulfate, barium sulfate, titanium dioxide, zinc oxide, alumina, aluminum hydroxide, magnesium carbonate, magnesium oxide, silica, magnesium aluminosilicate, calcium silicate, white carbon, bentonite, zeolite, sericite, smectite, and the like. Among them, kaolin is preferred. The organic-based loading material may include particles and the like of: polydienes, such as polyisoprene, polychloroprene, and polybutadiene; polyolefins, such as polybutene, polyisobutylene, and polypropylene; polymers of vinyl-based monomers, such as vinyl acetate, styrene, (meth)acrylic acid, (meth)acrylic acid alkyl ester, (meth)acrylamide, and methyl vinyl ether; polyurethane-based resins; polyester-based resins; polyamide-based resins; amino-based resins, such as urea resins, melamine resins, and benzoguanamine resins, and the like.

In a case of using the coating agent of the present invention for production of greaseproof paper, although the loading material content is not particularly limited, it is preferably 75 mass % or less based on the total solid content in the coating agent.

In addition, in a case of using the coating agent of the present invention for production of greaseproof paper, the coating agent may further contain auxiliaries, such as dispersants like polycarboxylic acid, surfactants, and humectants, as needed.

The amount of coating the coating agent coated on the surface of the paper substrate is preferably not less than 0.2 g/m$^2$ and not more than 20 g/m$^2$ with respect to solid content, and more preferably not less than 0.5 g/m$^2$ and not more than 10 g/m$^2$. The amount of coating the coating agent with respect to solid content is usually equivalent to weight of the coating layer per unit area formed on the surface of the paper substrate. The amount of coating the coating agent falling within the above range enables to efficiently obtain greaseproof paper more excellent in grease resistance. In a case of coating the coating agent on both sides of the paper substrate, it is preferred that the total amount of coating on both sides falls within the above range.

By coating the coating agent containing the POA modified PVA on the surface of the paper substrate, a greaseproof coating layer is formed. The layer constitution of the greaseproof paper of the present invention is not particularly limited, and for example, at least one coating layer may be equipped on at least one side of the paper substrate. In a case of eventually coating a same amount of the coating agent, a multilayer constitution is preferred to a single layer constitution because the grease resistance is improved. In a case of a multilayer constitution, the composition of each layer may be same and may also be different.

As the method of coating the coating agent, a coating method is employed appropriately that uses a coating device known in general, for example, a blade coater, an air knife coater, a roll coater, a reverse roll coater, a bar coater, a curtain coater, a slot die coater, a gravure coater, a champlex coater, a brush coater, a slide bead coater, a size press coater of the two-roll or metering blade mode, a billblade coater, a short dwell coater, a gate roll coater, a nip coater by calender, and the like.

For coating of the coating agent, an on-machine coating mode is preferred in view of costs. Particularly, in nip coating at a calender unit located in the latter section of the paper-making part, multistage coating is possible depending on the number of steps of smoothing rolls, so that high grease resistance is easily obtained with a less amount of coating, which is a preferred embodiment.

Although the coating temperature (temperature of the coating agent while coating) is not particularly limited, it is preferably not less than 10° C. and not more than 60° C., more preferably not less than 15° C. and not more than 55° C., and even more preferably not less than 20° C. and not more than 50° C.

In a case of producing the greaseproof paper by coating the coating agent on a surface of a paper substrate, it is preferred to coat the coating agent on a surface of the paper substrate having previously adjusted temperature of not less than 60° C. and not more than 100° C. The temperature of the paper substrate after adjusting is more preferably not less than 60° C. and not more than 90° C., and even more preferably not less than 60° C. and not more than 80° C. Adjusting the temperature of the paper substrate makes the coating agent to be instantly thickened and gelated to form a strong coating layer, so that it is possible to efficiently obtain greaseproof paper that has few cracks due to drying of the coating layer and that is excellent furthermore in grease resistance.

Usually, after the coating of the coating agent, drying treatment is carried out. The drying treatment can employ hot air, infrared rays, a heating cylinder, and a method combining them. The grease resistance can be improved furthermore by applying humidity conditioning and/or smoothing treatment to the greaseproof paper after drying. The humidification conditions are preferred in the condition of the water content in the greaseproof paper of not less than 5 mass % and not more than 20 mass %. It is possible to carry out the smoothing treatment using a smoothing treatment device, such as super calender, gloss calender, and soft calender, and treatment conditions thereof are preferred where the roll temperature is from ordinary temperature to 200° C. and the linear pressure of the rolls is not less than 20 kg/cm and not more than 350 kg/cm. The smoothing treatment may appropriately be carried out on machine or off machine.

The greaseproof paper of the present invention may further have another layer other than the layer of paper substrate and the coating layer. The greaseproof paper may also contain the POA modified PVA in the paper substrate. Even in such case, the greaseproof paper is capable of exhibiting high grease resistance and waterproofness.

<Film>

A film of the present invention contains the POA modified PVA.

Although a method of producing the film of the present invention is not particularly limited, it is possible to preferably use, for example, a method of forming a film using a solution containing the POA modified PVA. The solvent in the solution is not particularly limited, and it is possible to use, for example, water, organic solvents, or mixed liquids of water and an organic solvent. The POA modified PVA is dissolved in such solvent, thereby obtaining the solution. The solution may also contain, as needed, plasticizers, surfactants, dichroic dyes, inorganic salts, and the like. For the film forming method, it is possible to employ, for example, a method of forming a film from the solution by flow casting or die casting. Specifically, it is possible to use a method of forming a film from the solution on a resin film, on a drying drum, or on a drying belt in the film forming method. It is preferred to dry the solution after forming a film. Here, after drying, further heat treatment may also be applied as needed. The content of the POA modified PVA in the film thus obtained is preferably 50 mass % or more, and more preferably 80 mass % or more. Although the thickness of the film thus obtained is not particularly limited, it is preferably from 1 to 150 µm, and more preferably from 1 to 100 µm. The film of the present invention thus obtained has sufficient strength and stretching properties even in a single layer. Accordingly, it is possible to use the film of the present invention preferably as a single layer film.

It is possible to preferably use the film of the present invention for production of a multilayer structure prepared by laminating a film and a substrate. Although the method of producing the multilayer structure is not particularly limited, it is possible to employ, for example, a method of forming the film of the present invention on a substrate. For the method of forming the film, it is possible to employ a method same as the method of producing a film described above. For the substrate, it is possible to preferably use a supporting substrate that is generally used. The supporting substrate may be transparent and may also be non-transparent. The transparent supporting substrate may include a film, a sheet, and the like of polyester, polystyrene, polyvinyl chloride, polymethyl methacrylate, cellulose acetate, polycarbonate, polyimide, cellophane, celluloid, and the like, and highly transparent paper. The non-transparent supporting substrate may include general paper, pigment coated paper (art paper, coated paper, cast-coated paper), fabric, wood, a metal plate, synthetic paper, synthetic resin-based film and sheet subjected to non-transparency treatment, and the like.

Although the mechanism that the film of the present invention develops high strength and high stretching properties is not yet clear, it is it is assumed as follows. In the present invention, the POA group has a polyoxypropylene block on the main chain side and has a (poly)oxyethylene block on the end side in the POA modified PVA. It is considered that the POA group having such structure makes the hydrophobic interaction due to the aggregation between the polyoxypropylene blocks to easily occur. It is considered that the physical crosslink action between the POA groups is promoted in such a manner, thereby obtaining a film having high strength and high stretching properties. In the Examples described later, it is confirmed that the film of the present invention has higher strength and higher stretching properties compared with a film containing POA modified PVA having a POA group composed only of polyoxypropylene units, a film containing POA modified PVA having a POA group that has a (poly)oxyethylene block on the PVA main chain side and has a polyoxypropylene block on the end side, and a film containing POA modified PVA having an oxypropylene unit and an oxyethylene unit arranged randomly.

The POA modified PVA of the present invention is excellent in temperature-sensitive thickening properties as described above. Taking advantage of such features, it is used preferably as a material for various types of functional special paper, such as pressure sensitive paper, not only the ink jet recording material, the thermal paper, the release paper base paper, the greaseproof paper, and the film that are described above.

EXAMPLES

A detailed description is given below to the present invention by way of Examples and Comparative Examples. In Examples and Comparative Examples below, "parts" and "%" mean on a basis of mass unless otherwise specified.

PVA obtained by the following Production Examples was evaluated in accordance with the methods below.

[Viscosity Average Degree of Polymerization and Degree of Saponification]

The viscosity average degree of polymerization and the degree of saponification of PVA was obtained by a method according to JIS-K6726.

[POA Group Modification Rate]

The POA group modification rate of PVA is obtained according to a method using the proton NMR described above. For the proton NMR, JEOL GX-500 (500 MHz) was used.

[Viscosity of Aqueous PVA Solution]

A 4% aqueous solution of PVA was prepared and the viscosity at a temperature of 20° C., 30° C., or 60° C. at a rotor rotation speed of 6 rpm was measured using a BL type viscometer.

Production Example 1-1

Production of PVA 1-1

In a 3 L reactor provided with a stirrer, a reflux condenser tube, a nitrogen introduction tube, a monomer drop port, and an initiator addition port, 900 g of vinyl acetate, 100 g of methanol, and 3.7 g of a monomer A, which is an unsaturated monomer having a POA group, (The monomer A is represented by the general formula (II), and $R^1$ through $R^5$, X, m, and n are as shown in Table 2. The arrangement of an oxypropylene unit and an oxyethylene unit is in blocks, and a block of oxypropylene unit is located on the X side relative to a block of oxyethylene unit) were charged, and while nitrogen bubbling, inside the system was purged with nitrogen for 30 minutes. A solution was prepared as a delay solution by dissolving the monomer A in methanol to have a concentration of 20%, and was purged with nitrogen by nitrogen gas bubbling. A raise in temperature of the reactor was started, and when the internal temperature reached at 60° C., 0.25 g of 2,2'-azobisisobutyronitrile (AIBN) was added to start polymerization. While the delay solution was dropped to keep the monomer composition (ratio of vinyl acetate and the monomer A) in the polymerization solution constant, it was polymerized at 60° C. for three hours and then cooled to stop the polymerization. The total amount of the monomer used until stopping the polymerization was 17 g. The solid content concentration when stopping the polymerization was 26.2%. Subsequently, while occasionally adding methanol at 30° C. under reduced pressure, unreacted vinyl acetate was eliminated to obtain a methanol solution (concentration of 35%) of a POA modified vinyl ester-based polymer (POA modified PVAc). Further, 14.0 g of an alkaline solution (10% methanol solution of sodium hydroxide) was added to 386 g of a methanol solution (100.0 g of POA modified PVAc in the solution) of POA modified PVAc prepared by adding methanol thereto for saponification (POA modified PVAc concentration of the saponification solution of 25%, molar ratio of sodium hydroxide to vinyl acetate units in POA modified PVAc of 0.03). Since a gelatinous material was generated approximately one minute after adding the alkaline solution, it was pulverized by a pulverizer and was left at 40° C. for one hour to be proceeded with saponification, followed by adding 500 g of methyl acetate to neutralize residual alkali. After confirming the end of neutralization using a phenolphthalein indicator, a white solid was obtained by filtration, and a washing operation of adding 2000 g of methanol thereto and leaving at room temperature for three hours was carried out. After repeating the washing operation three times, a white solid obtained by centrifugal deliquoring was left at 65° C. for two days in a drier for drying, and thus POA modified PVA (PVA 1-1) was obtained. Results of measuring the viscosity average degree of polymerization, the degree of saponification, the POA group modification rate, and the viscosity of the aqueous solution of PVA 1-1 are shown in Table 3.

Example 1-1

Preparation of Gas Phase Silica Microparticle Dispersion

To 2400 g of ion exchange water with 12 g of acetic acid dissolved therein, 600 g of Aerosil A300 (produced by Nippon Aerosil Co., Ltd.), which is gas phase silica powder having the primary particles in the average particle diameter of approximately 12 nm, was added and it was stirred and dispersed by a three-one motor to prepare a dispersion having a solid content concentration of 20%. The dispersion was pulverized by a homogenizer (ULTRA-TURRAX T25 type, manufactured by IKA) at 9500 rpm for five minutes to obtain a viscous dispersion (solid content concentration of 20%) in opalescent slurry state. The average particle diameter of the inorganic microparticles dispersed in the dispersion was measured with a laser diffraction/scattering type particle size distribution measuring device (LA-910, manufactured by Horiba, Ltd.) as 230 nm.

(Production of Ink Jet Recording Material)

Prepared was 200 g of an aqueous solution of PVA 1-1 at 10% concentration, and it was added to 1000 g of the dispersion of gas phase silica at a solid content concentration of 20% obtained as above and it was mixed and stirred well to obtain a dispersion. After that, distilled water was added to prepare a coating agent where the total of PVA 1-1 and the gas phase silica is 15%. Next, a PET film (substrate) subjected to corona treatment was heated to 70° C., and the coating agent (temperature of 30° C.) was coated on a surface thereof using a meyer bar so as to have an amount of coating (while drying) of 15 g/m$^2$, and it was dried in a hot air drier at 100° C. for five minutes to produce an ink jet recording material. The ink jet recording material thus obtained was evaluated in the following methods. Results of evaluating PVA 1-1 and the ink jet recording material are shown in Table 3.

[Evaluation of Ink Jet Recording Material]

Cracks in the ink receiving layer were evaluated in methods described later. Further, ink absorbency when carrying out printing on the recording material using an ink jet printer was evaluated.

(1) Cracks

A surface of the ink receiving layer was observed with an optical microscope (magnification power of 100 times) and was evaluated in the following criteria.

5: No cracks at all were observed in the surface.
4: Almost no cracks were observed in the surface.
3: Cracks were observed partially in the surface.
2: Many cracks were observed in the surface.
1: Cracks were observed in the entire surface.

(2) Ink Absorbency

After daubing a black ink on the ink jet recording material using an ink jet printer (PM 2000C, manufactured by Seiko Epson Corp.), the printed surface was rubbed with a finger at every certain time interval to observe the degree of fading. The time taken to become not fading at all was measured and evaluated in the following criteria.

5: Less than five seconds.
4: Not less than five seconds and less than ten seconds.
3: Not less than ten seconds and less than 30 seconds.
2: Not less than 30 seconds and less than 60 seconds.
1: Not less than 60 seconds.

Production Examples 1-2 Through 1-13, 1-16 Through 1-22, 1-24, and 1-25

Production of PVA 1-2 Through 1-13, 1-16 Through 1-22, 1-24, and 1-25

Various types of POA modified PVA (PVA 1-2 through 1-13, 1-16 through 1-22, 1-24, and 1-25) were obtained by a method same as that in Production Example 1-1 other than modifying the amounts of charging vinyl acetate and methanol (before starting polymerization), the type (Table 2) of the unsaturated monomer having a POA group used for polymerization, the amount of using the same, the rate of polymerization thereof, the concentration of POA modified PVAc during saponification, and the molar ratio of sodium hydroxide to vinyl acetate units, as shown in Table 1.

Examples 1-2 Through 1-13, 1-17 and Comparative Examples 1-1 Through 1-7, 1-9

Using the POA modified PVA thus obtained, a coating agent was prepared to produce an ink jet recording material by a method same as that in Example 1-1. Results of evaluating PVA 1-2 through 1-13, 1-16 through 1-22, 1-24, and 1-25 and the ink jet recording materials produced by using them are shown in Table 3, respectively.

Production Example 1-14

Production of PVA 14

In a 3 L reactor provided with a stirrer, a reflux condenser tube, a nitrogen introduction tube, and an initiator addition port, 850 g of vinyl acetate, 150 g of methanol, and 42 g of a monomer I, which is an unsaturated monomer having a POA group, (The monomer I is represented by the general formula (II), and R$^1$ through R$^5$, X, m, and n are as shown in Table 2. The arrangement of an oxypropylene unit and an oxyethylene unit is in blocks, and a block of oxypropylene unit is located on the X side relative to a block of oxyethylene unit) were charged, and while nitrogen bubbling, inside the system was purged with nitrogen for 30 minutes. A raise in temperature of the reactor was started, and when the internal temperature reached at 60° C., 0.25 g of 2,2'-azobisisobutyronitrile (AIBN) was added to start polymerization, and it was polymerized at 60° C. for three hours and then cooled to stop the polymerization. The solid content concentration when stopping the polymerization was 25.5%. Subsequently, while occasionally adding methanol at 30° C. under reduced pressure, unreacted vinyl acetate was eliminated to obtain a methanol solution (concentration of 30%) of a POA modified vinyl ester-based polymer (POA modified PVAc). Further, 16.7 g of an alkaline solution (10% methanol solution of sodium hydroxide) was added to 463.2 g of a methanol solution (120.0 g of POA modified PVAc in the solution) of POA modified PVAc prepared by adding methanol thereto for saponification (POA modified PVAc concentration of the saponification solution of 25%, molar ratio of sodium hydroxide to vinyl acetate units in POA modified PVAc of 0.03). Since a gelatinous material was generated approximately one minute after adding the alkaline solution, it was pulverized by a pulverizer and was left at 40° C. for one hour to be proceeded with saponification, followed by adding 500 g of methyl acetate to neutralize residual alkali. After confirming the end of neutralization using a phenolphthalein indicator, a white solid was obtained by filtration, and a washing operation of adding 2000 g of methanol thereto and leaving at room temperature for three hours was carried out. After repeating the washing operation three times, a white solid obtained by centrifugal deliquoring was left at 65° C. for two days in a drier for drying, and thus POA modified PVA (PVA 1-14) was obtained. Results of measuring the viscosity average degree of polymerization, the degree of saponification, the POA group modification rate, and the viscosity of the aqueous PVA solution of PVA 1-14 are shown in Table 3.

Example 1-14

Using the POA modified PVA thus obtained, a coating agent was prepared by a method same as that in Example 1-1 to produce an ink jet recording material. Results of evaluating PVA 1-14 and the ink jet recording material produced by using it are shown in Table 3.

Production Examples 1-15 and 1-23

Production of PVA 1-15 and 1-23

Various types of POA modified PVA (PVA 1-15 and 1-23) were obtained by a method same as that in Production Example 1-14 other than modifying the type (Table 2) of the unsaturated monomer having a POA group used for polymerization and the amount of using the same, as shown in Table 1.

Example 1-15, Comparative Example 1-8

Using the POA modified PVA thus obtained, a coating agent was prepared by a method same as that in Example 1-1 to produce an ink jet recording material. Results of evaluating PVA 1-15 and 1-23 and the ink jet recording materials produced by using them are shown in Table 3, respectively.

Production Examples 1-26 and 1-27

Production of PVA 1-26 and 1-27

Various types of POA modified PVA (1-26 and 1-27) were obtained by a method same as that in Production Example 1-1 other than using unsaturated monomers having the following structures (Production Example 1-26: compound III, Production Example 1-27: compound IV) respectively as the unsaturated monomers having a POA group used for polymerization and modifying the amount of using the same and the amounts of charging vinyl acetate and methanol (before starting polymerization), as shown in Table 1. Results of measuring the viscosity average degree of polymerization, the degree of saponification, the POA group modification rate of these types of POA modified PVA, and the viscosity of the aqueous PVA solution are shown in Table 3.

[chem. 5]

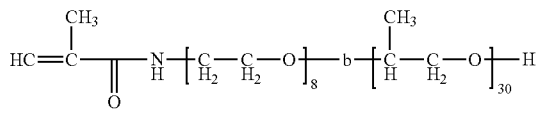

(III)

(In the compound III, the oxypropylene units and the oxyethylene units are arranged in blocks respectively, and the positions of the polyoxyethylene blocks and the polyoxypropylene blocks are as described in the above formula.)

[chem. 6]

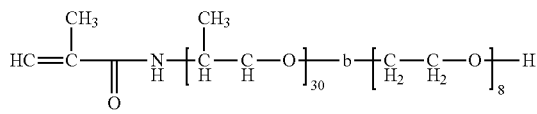

(IV)

(In the compound IV, the oxypropylene units and the oxyethylene units are arranged randomly.)

Comparative Examples 1-10 and 1-11

Using the POA modified PVA thus obtained (PVA 1-26 and 1-27), a coating agent was prepared by a method same as that in Example 1-1 to produce an ink jet recording material, respectively. Results of evaluating PVA 1-26 and 1-27 and the ink jet recording materials produced by using them are shown in Table 3, respectively.

Example 1-16

A coating agent was prepared to produce an ink jet recording material by a method same as that in Example 1-3 other than modifying the temperature of the PET film (substrate) subjected to corona treatment when producing an ink jet recording material. Results of evaluating PVA 1-3 and the ink jet recording material produced by using it are shown in Table 3.

The conditions of producing PVA 1-1 through 1-27 are shown in Table 1, the structures of the unsaturated monomers having a POA group (the monomer structures correspond to the general formula (II)) are shown in Table 2, and the results of evaluating the various types of POA modified PVA and the ink jet recording materials are shown in Table 3.

TABLE 1

| | | Charge[1] | | | | | Saponification Conditions | |
|---|---|---|---|---|---|---|---|---|
| | | | | Unsaturated Monomer having POA Group | | | | |
| | PVA | Vinyl Acetate (g) | Methanol (Before Starting Polymerization) (g) | Type | Amount of Use (g) | Rate of Polymerization (%) | PVAc Concentration (%) | NaOH Molar Ratio[2] |
| Production Example 1-1 | PVA 1-1 | 900 | 100 | A | 17 | 30 | 25 | 0.03 |
| Production Example 1-2 | PVA 1-2 | 850 | 150 | A | 15 | 30 | 25 | 0.03 |
| Production Example 1-3 | PVA 1-3 | 750 | 250 | A | 17 | 40 | 25 | 0.03 |
| Production Example 1-4 | PVA 1-4 | 400 | 600 | A | 11 | 50 | 25 | 0.03 |
| Production Example 1-5 | PVA 1-5 | 850 | 150 | A | 15 | 30 | 25 | 0.0075 |
| Production Example 1-6 | PVA 1-6 | 850 | 150 | A | 15 | 30 | 25 | 0.01 |
| Production Example 1-7 | PVA 1-7 | 850 | 150 | A | 62 | 30 | 25 | 0.03 |
| Production Example 1-8 | PVA 1-8 | 850 | 150 | A | 140 | 30 | 25 | 0.03 |
| Production Example 1-9 | PVA 1-9 | 850 | 150 | A | 4 | 30 | 25 | 0.03 |
| Production Example 1-10 | PVA 1-10 | 850 | 150 | B | 11 | 30 | 25 | 0.03 |
| Production Example 1-11 | PVA 1-11 | 850 | 150 | D | 14 | 30 | 25 | 0.03 |
| Production Example 1-12 | PVA 1-12 | 850 | 150 | E | 21 | 30 | 25 | 0.03 |
| Production Example 1-13 | PVA 1-13 | 850 | 150 | H | 15 | 30 | 25 | 0.03 |
| Production Example 1-14 | PVA 1-14 | 850 | 150 | I | 42 | 30 | 25 | 0.03 |
| Production Example 1-15 | PVA 1-15 | 850 | 150 | K | 135 | 30 | 25 | 0.03 |
| Production Example 1-16 | PVA 1-16 | 200 | 800 | A | 8 | 75 | 25 | 0.03 |
| Production Example 1-17 | PVA 1-17 | 850 | 150 | A | 15 | 30 | 25 | 0.003 |
| Production Example 1-18 | PVA 1-18 | 850 | 150 | A | 869 | 30 | 25 | 0.03 |
| Production Example 1-19 | PVA 1-19 | 850 | 150 | A | 2 | 30 | 25 | 0.03 |
| Production Example 1-20 | PVA 1-20 | 850 | 150 | C | 6 | 30 | 25 | 0.03 |
| Production Example 1-21 | PVA 1-21 | 850 | 150 | F | 32 | 30 | 25 | 0.03 |
| Production Example 1-22 | PVA 1-22 | 850 | 150 | G | 13 | 30 | 25 | 0.03 |
| Production Example 1-23 | PVA 1-23 | 850 | 150 | J | 28 | 30 | 25 | 0.03 |
| Production Example 1-24 | PVA 1-24 | 850 | 150 | L | 10 | 30 | 25 | 0.03 |
| Production Example 1-25 | PVA 1-25 | 850 | 150 | M | 19 | 30 | 25 | 0.03 |
| Production Example 1-26 | PVA 1-26 | 850 | 150 | Compound III | 15 | 30 | 25 | 0.03 |
| Production Example 1-27 | PVA 1-27 | 850 | 150 | Compound IV | 15 | 30 | 25 | 0.03 |

[1] In All Production Examples, 0.25 g of 2,2'-Azobisisobutyronitrile (AIBN) was Used for Polymerization Initiator.
[2] Molar Ratio of Sodium Hydroxide (NaOH) to Vinyl Acetate Units in PVAc

TABLE 2

| Monomer | $R^1$ | $R^2$ | $R^3$ | $R^4$ | $R^5$ | $X^{1)}$ | m | n |
|---|---|---|---|---|---|---|---|---|
| A | H | $CH_3$ | H | H | $CH_3$ | —CO—NH—* | 30 | 8 |
| B | H | $CH_3$ | H | H | $CH_3$ | —CO—NH—* | 18 | 8 |
| C | H | $CH_3$ | H | H | $CH_3$ | —CO—NH—* | 8 | 8 |
| D | H | $CH_3$ | H | H | $CH_3$ | —CO—NH—* | 30 | 3 |
| E | H | $CH_3$ | H | H | $CH_3$ | —CO—NH—* | 30 | 25 |
| F | H | $CH_3$ | H | H | $CH_3$ | —CO—NH—* | 30 | 60 |
| G | H | $CH_3$ | H | H | $CH_3$ | —CO—NH—* | 30 | 0 |
| H | H | $CH_3$ | H | H | H | —CO—NH—* | 30 | 8 |
| I | H | $CH_3$ | H | H | H | —CH$_2$—O—* | 30 | 8 |
| J | H | $CH_3$ | H | H | H | —CH$_2$—O—* | 24 | 0 |
| K | H | $CH_3$ | H | H | H | —O— | 30 | 8 |
| L | H | — | — | H | $CH_3$ | —CO—NH—* | 0 | 25 |
| M | $CH_3$ | $CH_3$ | H | H | $CH_3$ | —CO—NH—* | 30 | 8 |

1)*Denotes POA Group Side

TABLE 3

| | | POA Modified PVA | | | PVA Evaluation Results |
|---|---|---|---|---|---|
| | Type | Viscosity Average Degree of Polymerization | POA Group Modification Rate (mol %) | Degree of Saponification (mol %) | 20° C. Viscosity $\eta_1$ (mPa · s) |
| Example 1-1 | PVA 1-1 | 3,000 | 0.2 | 98 | 100 |
| Example 1-2 | PVA 1-2 | 2,400 | 0.2 | 98 | 70 |
| Example 1-3 | PVA 1-3 | 1,700 | 0.2 | 98 | 30 |
| Example 1-4 | PVA 1-4 | 500 | 0.2 | 98 | 6 |
| Example 1-5 | PVA 1-5 | 2,400 | 0.2 | 88 | 60 |
| Example 1-6 | PVA 1-6 | 2,400 | 0.2 | 60 | 50 |
| Example 1-7 | PVA 1-7 | 2,400 | 0.8 | 98 | 90 |
| Example 1-8 | PVA 1-8 | 2,400 | 1.8 | 98 | 120 |
| Example 1-9 | PVA 1-9 | 2,400 | 0.05 | 98 | 65 |
| Example 1-10 | PVA 1-10 | 2,400 | 0.2 | 98 | 65 |
| Example 1-11 | PVA 1-11 | 2,400 | 0.2 | 98 | 70 |
| Example 1-12 | PVA 1-12 | 2,400 | 0.2 | 98 | 70 |
| Example 1-13 | PVA 1-13 | 2,400 | 0.2 | 98 | 70 |
| Example 1-14 | PVA 1-14 | 2,400 | 0.2 | 98 | 70 |
| Example 1-15 | PVA 1-15 | 2,400 | 0.2 | 98 | 70 |
| Example 1-16 | PVA 1-3 | 1,700 | 0.2 | 98 | 30 |
| Example 1-17 | PVA 1-25 | 2,400 | 0.2 | 98 | 70 |
| Comparative Example 1-1 | PVA 1-16 | 100 | 0.2 | 98 | 1 |
| Comparative Example 1-2[1)] | PVA 1-17 | 2,400 | 0.2 | 30 | — |
| Comparative Example 1-3[2)] | PVA 1-18 | 2,400 | 11 | 98 | 80 |
| Comparative Example 1-4 | PVA 1-19 | 2,400 | 0.02 | 98 | 60 |
| Comparative Example 1-5 | PVA 1-20 | 2,400 | 0.2 | 98 | 60 |
| Comparative Example 1-6 | PVA 1-21 | 2,400 | 0.2 | 98 | 65 |
| Comparative Example 1-7 | PVA 1-22 | 2,400 | 0.2 | 98 | 80 |
| Comparative Example 1-8 | PVA 1-23 | 2,400 | 0.2 | 98 | 65 |
| Comparative Example 1-9 | PVA 1-24 | 2,400 | 0.2 | 98 | 60 |
| Comparative Example 1-10 | PVA 1-26 | 2,400 | 0.2 | 98 | 85 |
| Comparative Example 1-11 | PVA 1-27 | 2,400 | 0.2 | 98 | 80 |

| | PVA Evaluation Results | | Ink Jet Recording Material Evaluation Results | | |
|---|---|---|---|---|---|
| | 60° C. Viscosity $\eta_2$ (mPa · s) | Viscosity Ratio $\eta_2/\eta_1$ | Substrate Surface Temperature (° C.) | Cracks | Ink Absorbency | Overall |
| Example 1-1 | 60,000 | 600.0 | 70 | 5 | 5 | 10 |
| Example 1-2 | 30,000 | 428.6 | 70 | 4 | 4 | 8 |
| Example 1-3 | 10,000 | 333.3 | 70 | 3 | 3 | 6 |
| Example 1-4 | 200 | 33.3 | 70 | 2 | 3 | 5 |
| Example 1-5 | 18,000 | 300.0 | 70 | 4 | 5 | 9 |
| Example 1-6 | 12,000 | 240.0 | 70 | 4 | 4 | 8 |
| Example 1-7 | 60,000 | 666.7 | 70 | 4 | 4 | 8 |
| Example 1-8 | 90,000 | 750.0 | 70 | 4 | 3 | 7 |
| Example 1-9 | 180 | 2.8 | 70 | 3 | 3 | 6 |
| Example 1-10 | 9,000 | 138.5 | 70 | 4 | 4 | 8 |
| Example 1-11 | 20,000 | 285.7 | 70 | 4 | 4 | 8 |
| Example 1-12 | 12,000 | 171.4 | 70 | 4 | 3 | 7 |
| Example 1-13 | 24,000 | 342.9 | 70 | 4 | 4 | 8 |
| Example 1-14 | 22,000 | 314.3 | 70 | 4 | 4 | 8 |
| Example 1-15 | 20,000 | 285.7 | 70 | 4 | 4 | 8 |
| Example 1-16 | 10,000 | 333.3 | 20 | 2 | 3 | 5 |
| Example 1-17 | 35,000 | 500.0 | 70 | 4 | 5 | 9 |
| Comparative Example 1-1 | 1 | 1.0 | 70 | 1 | 1 | 2 |
| Comparative Example 1-2[1)] | — | — | — | — | — | — |
| Comparative Example 1-3[2)] | 80 | 1.0 | 70 | 2 | 2 | 4 |
| Comparative Example 1-4 | 60 | 1.0 | 70 | 2 | 2 | 4 |

TABLE 3-continued

| | | | | | | |
|---|---|---|---|---|---|---|
| Comparative Example 1-5 | 50 | 0.8 | 70 | 2 | 2 | 4 |
| Comparative Example 1-6 | 70 | 1.1 | 70 | 2 | 2 | 4 |
| Comparative Example 1-7 | 80 | 1.0 | 70 | 2 | 2 | 4 |
| Comparative Example 1-8 | 60 | 0.9 | 70 | 2 | 2 | 4 |
| Comparative Example 1-9 | 45 | 0.8 | 70 | 2 | 2 | 4 |
| Comparative Example 1-10 | 160 | 1.9 | 70 | 2 | 2 | 4 |
| Comparative Example 1-11 | 155 | 1.9 | 70 | 2 | 2 | 4 |

[1])Solubility of PVA 1-17 was too Low to Prepare 4 mass % Aqueous Solution of PVA, so that PVA and Ink Jet Recording Material were not Evaluated.
[2])4 mass % Aqueous Solution of PVA 1-18 was Turbid.

From the evaluation results in Table 3, it is understood that an ink jet recording material that has few cracks in the surface and is excellent in ink absorbency is obtained using the coating agent containing the POA modified PVA of the present invention (Examples 1-1 through 1-17). Meanwhile, in a case that the viscosity average degree of polymerization, the POA group modification rate, or the degree of saponification of the POA modified PVA does not satisfy the prescribed range (Comparative Examples 1-1 through 1-4) or in a case that the POA group does not satisfy the prescribed structure (Comparative Examples 1-5 through 1-11), it is understood that the ink jet recording material produced using the coating agent containing the POA modified PVA has increased cracks and decreased ink absorbency.

Production Example 2-1

Production of PVA 2-1

By a method same as that in Production Example 1-1, POA modified PVA (PVA 2-1) was obtained. Results of measuring the viscosity average degree of polymerization, the degree of saponification, and the POA group modification rate of PVA 2-1 are shown in Table 4.

Production Examples 2-2 Through 2-15, 2-18 Through 2-24, 2-26, and 2-27

Production of PVA 2-2 Through 2-15, 2-18 Through 2-24, 2-26, and 2-27

Various types of POA modified PVA (PVA 2-2 through 2-15, 2-18 through 2-24, 2-26, and 2-27) were obtained by a method same as that in Production Example 1-1 other than modifying the amounts of charging vinyl acetate and methanol (before starting polymerization), the type (Table 2) of the unsaturated monomer having a POA group used for polymerization, the amount of using the same, the rate of polymerization, the concentration of POA modified PVAc during saponification, and the molar ratio of sodium hydroxide to vinyl acetate units, as shown in Table 4. Results of measuring the viscosity average degree of polymerization, the degree of saponification, and the POA group modification rate of these types of POA modified PVA are shown in Table 5.

Production Example 2-16

Production of PVA 2-16

By a method same as that in Production Example 1-14, POA modified PVA (PVA 2-16) was obtained. Results of measuring the viscosity average degree of polymerization, the degree of saponification, and the POA group modification rate of PVA 2-16 are shown in Table 5.

Production Examples 2-17 and 2-25

Production of PVA 2-17 and 2-25

Various types of POA modified PVA (PVA 2-17 and 2-25) were obtained by a method same as that in Production Example 1-14 other than modifying the type (Table 2) of the unsaturated monomer having a POA group used for polymerization and the amount of using the same, as shown in Table 4. Results of measuring the viscosity average degree of polymerization, the degree of saponification, and the POA group modification rate of these types of POA modified PVA are shown in Table 5.

Production Examples 2-28 and 2-29

Production of PVA 2-28 and 2-29

By a method same as that in Production Examples 1-26 and 1-27, PVA 2-28 and 2-29 were obtained. Results of measuring the viscosity average degree of polymerization, the degree of saponification, and the POA group modification rate of these types of POA modified PVA are shown in Table 5.

Production Example 2-30

Production of PVA 2-30

In a 3 L pressure reactor provided with a stirrer, a nitrogen introduction port, an ethylene introduction port, and an initiator addition port, 750 g of vinyl acetate and 250 g of methanol were charged, and after rising the temperature to 60° C., inside the system was purged with nitrogen for 30 minutes by nitrogen bubbling. Subsequently, ethylene was introduced to make the pressure in the reactor at 1.4 kg/cm$^2$. A raise in temperature of the reactor was started, and when the internal temperature reached at 60° C., 0.25 g of 2,2'-azobisisobutyronitrile (AIBN) was added to start polymerization. Ethylene was introduced during the polymerization to maintain the reactor pressure at 5.9 kg/cm$^2$ and the polymerization temperature at 60° C. When the rate of polymerization became 20% after four hours, it was cooled to stop the polymerization. After removing ethylene by opening the reactor, de-ethylenation was carried out thoroughly by bubbling nitrogen gas. Subsequently, while occasionally adding methanol under reduced pressure, unreacted vinyl acetate was eliminated to obtain a methanol solution of an ethylene modified vinyl ester-based polymer (Et modified PVAc). Further, 14.1 g of an alkaline solution (10% methanol solution of sodium hydroxide) was added to 333 g of a methanol solution (100.0 g of Et modified PVAc in the solution) of Et modified PVAc prepared by adding methanol thereto for saponification (Et modified PVAc concentration of the saponification solution of 29%, molar ratio of sodium hydroxide to vinyl acetate units in Et modified PVAc of 0.03). Since a gelatinous material was generated approximately one minute after adding the alkaline solution, it was pulverized by a pulverizer and was left at 60° C. for one hour to be proceeded with saponification, followed by adding 500 g of methyl acetate to neutralize residual alkali. After confirming the end of neutralization using a phenolphthalein indicator, a white solid was obtained by filtration, and a washing operation of adding 2000 g of methanol thereto and leaving at room temperature for three hours was carried out. After repeating the washing operation three times, a white solid obtained by centrifugal deliquoring was left at 65° C. for two days in a drier for drying, and thus Et modified PVA (PVA 2-30) was obtained. Results of measuring the viscosity average degree of polymerization, the degree of saponification, and the ethylene modification rate of PVA 2-30 are shown in Table 5.

Production Example 2-31

Production of PVA 2-31

In a 3 L reactor provided with a stirrer, a reflux condenser tube, a nitrogen introduction tube, and an initiator addition port, 700 g of vinyl acetate and 300 g of methanol were charged, and while nitrogen bubbling, inside the system was purged with nitrogen for 30 minutes. A raise in temperature of the reactor was started, and when the internal temperature reached at 60° C., 0.25 g of 2,2'-azobisisobutyronitrile (AIBN) was added to start polymerization, and it was polymerized at 60° C. for three hours and then cooled to stop the polymerization. The solid content concentration when stopping the polymerization was 17.0%. Subsequently, while occasionally adding methanol at 30° C. under reduced pressure, unreacted vinyl acetate was eliminated to obtain a methanol solution (concentration of 30%) of an unmodified vinyl ester-based polymer (unmodified PVAc). Further, 16.7 g of an alkaline solution (10% methanol solution of sodium hydroxide) was added to 463.2 g of a methanol solution (120.0 g of unmodified PVAc in the solution) of unmodified PVAc prepared by adding methanol thereto for saponification (unmodified PVAc concentration of the saponification solution of 25%, molar ratio of sodium hydroxide to vinyl acetate units in unmodified PVAc of 0.03). Since a gelatinous material was generated approximately one minute after adding the alkaline solution, it was pulverized by a pulverizer and was left at 40° C. for one hour to be proceeded with saponification, followed by adding 500 g of methyl acetate to neutralize residual alkali. After confirming the end of neutralization using a phenolphthalein indicator, a white solid was obtained by filtration, and a washing operation of adding 2000 g of methanol thereto and leaving at room temperature for three hours was carried out. After repeating the washing operation three times, a white solid obtained by centrifugal deliquoring was left at 65° C. for two days in a drier for drying, and thus unmodified PVA (PVA 2-31) was obtained. Results of measuring the viscosity average degree of polymerization and the degree of saponification of PVA 2-31 are shown in Table 5.

TABLE 4

| | | Charge[1] | | | | | Saponification Conditions | |
| | | Vinyl Acetate (g) | Methanol (Before Starting Polymerization) (g) | Unsaturated Monomer having POA Group | | Rate of Polymerization (%) | PVAc Concentration (%) | NaOH Molar Ratio[2] |
| | PVA | | | Type | Amount of Use (g) | | | |
|---|---|---|---|---|---|---|---|---|
| Production Example 2-1 | PVA2-1 | 900 | 100 | A | 17 | 30 | 25 | 0.03 |
| Production Example 2-2 | PVA2-2 | 850 | 150 | A | 15 | 30 | 25 | 0.03 |
| Production Example 2-3 | PVA2-3 | 750 | 250 | A | 17 | 40 | 25 | 0.03 |
| Production Example 2-4 | PVA2-4 | 900 | 100 | A | 15 | 20 | 20 | 0.03 |
| Production Example 2-5 | PVA2-5 | 400 | 600 | A | 11 | 50 | 25 | 0.03 |
| Production Example 2-6 | PVA2-6 | 850 | 150 | A | 15 | 30 | 25 | 0.01 |
| Production Example 2-7 | PVA2-7 | 850 | 150 | A | 15 | 30 | 25 | 0.0075 |
| Production Example 2-8 | PVA2-8 | 850 | 150 | A | 62 | 30 | 25 | 0.03 |
| Production Example 2-9 | PVA2-9 | 850 | 150 | A | 140 | 30 | 25 | 0.03 |
| Production Example 2-10 | PVA2-10 | 850 | 150 | A | 455 | 30 | 25 | 0.03 |
| Production Example 2-11 | PVA2-11 | 850 | 150 | A | 4 | 30 | 25 | 0.03 |
| Production Example 2-12 | PVA2-12 | 850 | 150 | B | 11 | 30 | 25 | 0.03 |
| Production Example 2-13 | PVA2-13 | 850 | 150 | D | 14 | 30 | 25 | 0.03 |
| Production Example 2-14 | PVA2-14 | 850 | 150 | E | 21 | 30 | 25 | 0.03 |
| Production Example 2-15 | PVA2-15 | 850 | 150 | H | 15 | 30 | 25 | 0.03 |
| Production Example 2-16 | PVA2-16 | 850 | 150 | I | 42 | 30 | 25 | 0.03 |
| Production Example 2-17 | PVA2-17 | 850 | 150 | K | 135 | 30 | 25 | 0.03 |
| Production Example 2-18 | PVA2-18 | 200 | 800 | A | 8 | 75 | 25 | 0.03 |
| Production Example 2-19 | PVA2-19 | 850 | 150 | A | 15 | 30 | 25 | 0.003 |
| Production Example 2-20 | PVA2-20 | 850 | 150 | A | 869 | 30 | 25 | 0.03 |
| Production Example 2-21 | PVA2-21 | 850 | 150 | A | 2 | 30 | 25 | 0.03 |
| Production Example 2-22 | PVA2-22 | 850 | 150 | C | 6 | 30 | 25 | 0.03 |
| Production Example 2-23 | PVA2-23 | 850 | 150 | F | 32 | 30 | 25 | 0.03 |
| Production Example 2-24 | PVA2-24 | 850 | 150 | G | 13 | 30 | 25 | 0.03 |
| Production Example 2-25 | PVA2-25 | 850 | 150 | J | 28 | 30 | 25 | 0.03 |
| Production Example 2-26 | PVA2-26 | 850 | 150 | L | 10 | 30 | 25 | 0.03 |
| Production Example 2-27 | PVA2-27 | 850 | 150 | M | 19 | 30 | 25 | 0.03 |
| Production Example 2-28 | PVA2-28 | 850 | 150 | Compound III | 15 | 30 | 25 | 0.03 |
| Production Example 2-29 | PVA2-29 | 850 | 150 | Compound IV | 15 | 30 | 25 | 0.03 |
| Production Example 2-30 | PVA2-30 | 750 | 250 | (Ethylene) | — | 20 | 30 | 0.03 |
| Production Example 2-31 | PVA2-31 | 700 | 300 | — | — | 40 | 25 | 0.03 |

[1]In All Production Examples, 0.25 g of 2,2'-Azobisisobutyronitrile (AIBN) was used for Polymerization Initiator.
[2]Molar Ratio of Sodium Hydroxide (NaOH) to Vinyl Acetate Units in PVAc

Example 2-1

Production of Release Paper Base Paper

Semi-glassine paper (paper substrate) having basis weight of 80 g/m² and air permeability of 140 seconds was heated to 60° C., and on one surface thereof, a 4% aqueous solution of the PVA 2-1 was hand coated as a coating agent (temperature of 30° C., viscosity $\eta_3$ of 95 mPa·s) using a meyer bar so as to have an amount of coating of 1.1 g/m² per side of the paper substrate with respect to solid content. Next, it was dried using a hot air drier at 110° C. for one minute and humidity conditioned at 20° C. and 65% RH for 72 hours, and super calender treatment was performed once in the conditions of 150° C., 250 kg/cm, and 10 m/minute to obtain release paper base paper having a coated layer formed on the surface of the paper substrate. Regarding the release paper base paper thus obtained, the filling properties, the grease resistance, and the waterproofness were evaluated in the following methods. Evaluation results are shown in Table 5.

(Production of Release Paper)

A silicone solution having the following composition was prepared.

| | |
|---|---|
| Addition reaction silicone (SD 7220, produced by Dow Corning Toray Co., Ltd.) | 4.5 parts |
| Platinum catalyst (SRX 212, produced by Dow Corning Toray Co., Ltd.) | 0.5 parts |
| Toluene | 95 parts |

The silicone solution thus prepared was hand coated on the release paper base paper using a meyer bar so as to have an amount of coating of 2.0 g/m² per side of the paper substrate with respect to solid content to obtain release paper.

(Production of Laminate)

On a silicone coating surface of the release paper, an acryl-based emulsion adhesive (Saivinol AT560, produced by Saiden Chemical Industry Co., Ltd.) was coated using a meyer bar so as to have an amount of coating of 25 g/m². Subsequently, on the adhesive, leuco dye-based thermal recording paper having basis weight of 72 g/m² was placed and bonded by a press roll to obtain a laminate.

[Filling Properties of Release Paper Base Paper]

The gas permeability (filling properties) of the release paper base paper was measured using an Oken type air-permeability and smoothness tester according to JIS-P8117 to determine the filling properties in accordance with the following criteria.

5: Not less than 50000 seconds
4: Not less than 30000 seconds and less than 50000 seconds
3: Not less than 10000 seconds and less than 30000 seconds
2: Not less than 1000 seconds and less than 10000 seconds
1: Less than 1000 seconds

[Grease Resistance of Release Paper Base Paper]

After applying colored toluene (red) on a surface of the coating layer of the release paper base paper in 5 cm×5 cm, the degree of bleed (small red spots or coloration to the unapplied surface) through the back side (unapplied surface) was evaluated to determine the toluene barrier properties (grease resistance) in accordance with the following criteria.

5: No spots on the back side
4: A few spots (up to three)
3: Many spots (the colored area is less than 20% of the applied area)
2: The colored area is not less than 20% and less than 50% of the applied area
1: The colored area is not less than 50%

[Waterproofness of Release Paper Base Paper]

After dropping approximately 1 ml of ion exchange water at 20° C. on a surface of the coating layer of the release paper base paper, that area was rubbed with a fingertip and the number of rubbing was measured when it was felt slimy on the finger tip for the first time (wet rub test) to determine the waterproofness in accordance with the following criteria.

5: Not less than 30 times
4: not less than 20 times and less than 30 times
3: Not less than ten times and less than 20 times
2: Not less than five times and less than ten times
1: Less than five times

Examples 2-2 Through 2-17 and 2-19 and Comparative Examples 2-1 Through 2-13

Release paper base paper, release paper, and a laminate were produced in a same manner as those in Example 2-1 other than using PVA shown in Table 5 instead of PVA 2-1 used in Example 2-1, and the filling properties, the grease resistance, and the waterproofness of the release paper base paper were evaluated in a same manner as those in Example 2-1. Evaluation results thereof are shown in Table 5.

Example 2-18

Release paper base paper, release paper, and a laminate were produced in a same manner as those in Example 2-1 other than using PVA 2-3 instead of PVA 2-1 used in Example 2-1 and modifying the temperature of semi-glassine paper (paper substrate) while coating the coating agent to 20° C., and the filling properties, the grease resistance, and the waterproofness of the release paper base paper were evaluated in a same manner as those in Example 2-1. Evaluation results thereof are shown in Table 5.

TABLE 5

| | PVA | | | | Temperature of Paper Substrate ° C. |
|---|---|---|---|---|---|
| | Type | Viscosity Average Degree of Polymerization | POA Group Modification Rate (mol %) | Degree of Saponification (mol %) | |
| Example 2-1 | PVA2-1 | 3,000 | 0.2 | 98 | 60 |
| Example 2-2 | PVA2-2 | 2,400 | 0.2 | 98 | 60 |
| Example 2-3 | PVA2-3 | 1,700 | 0.2 | 98 | 60 |
| Example 2-4 | PVA2-4 | 4,800 | 0.2 | 98 | 60 |
| Example 2-5 | PVA2-5 | 500 | 0.2 | 98 | 60 |
| Example 2-6 | PVA2-6 | 2,400 | 0.2 | 88 | 60 |
| Example 2-7 | PVA2-7 | 2,400 | 0.2 | 60 | 60 |
| Example 2-8 | PVA2-8 | 2,400 | 0.8 | 98 | 60 |
| Example 2-9 | PVA2-9 | 2,400 | 1.8 | 98 | 60 |

TABLE 5-continued

| | | | | | | Coating Agent Viscosity η₃ while Coating (mPa·s) | Filling Properties | Grease Resistance | Waterproofness |
|---|---|---|---|---|---|---|---|---|---|
| Example 2-10 | PVA2-10 | 2,400 | 5 | 98 | 60 | 92 | 4 | 4 | 5 |
| Example 2-11 | PVA2-11 | 2,400 | 0.05 | 98 | 60 | 57 | 3 | 3 | 3 |
| Example 2-12 | PVA2-12 | 2,400 | 0.2 | 98 | 60 | 58 | 5 | 4 | 5 |
| Example 2-13 | PVA2-13 | 2,400 | 0.2 | 98 | 60 | 66 | 5 | 4 | 5 |
| Example 2-14 | PVA2-14 | 2,400 | 0.2 | 98 | 60 | 63 | 4 | 4 | 5 |
| Example 2-15 | PVA2-15 | 2,400 | 0.2 | 98 | 60 | 65 | 5 | 4 | 5 |
| Example 2-16 | PVA2-16 | 2,400 | 0.2 | 98 | 60 | 64 | 5 | 4 | 5 |
| Example 2-17 | PVA2-17 | 2,400 | 0.2 | 98 | 60 | 62 | 5 | 4 | 5 |
| Example 2-18 | PVA2-3 | 1,700 | 0.2 | 98 | 20 | 27 | 4 | 3 | 4 |
| Example 2-19 | PVA2-27 | 2,400 | 0.2 | 98 | 60 | 70 | 5 | 5 | 5 |
| Comparative Example 2-1 | PVA2-18 | 100 | 0.2 | 98 | 60 | 1 | 1 | 2 | 2 |
| Comparative Example 2-2[1] | PVA2-19 | 2,400 | 0.2 | 30 | — | — | — | — | — |
| Comparative Example 2-3[2] | PVA2-20 | 2,400 | 11 | 98 | 60 | 74 | 2 | 2 | 1 |
| Comparative Example 2-4 | PVA2-21 | 2,400 | 0.02 | 98 | 60 | 55 | 1 | 2 | 2 |
| Comparative Example 2-5 | PVA2-22 | 2,400 | 0.2 | 98 | 60 | 53 | 1 | 2 | 2 |
| Comparative Example 2-6 | PVA2-23 | 2,400 | 0.2 | 98 | 60 | 61 | 1 | 1 | 2 |
| Comparative Example 2-7 | PVA2-24 | 2,400 | 0.2 | 98 | 60 | 76 | 2 | 2 | 1 |
| Comparative Example 2-8 | PVA2-25 | 2,400 | 0.2 | 98 | 60 | 59 | 2 | 2 | 1 |
| Comparative Example 2-9 | PVA2-26 | 2,400 | 0.2 | 98 | 60 | 55 | 1 | 2 | 1 |
| Comparative Example 2-10 | PVA2-28 | 2,400 | 0.2 | 98 | 60 | 80 | 2 | 3 | 2 |
| Comparative Example 2-11 | PVA2-29 | 2,400 | 0.2 | 98 | 60 | 73 | 2 | 2 | 2 |
| Comparative Example 2-12 | PVA2-30 | 1,700 | 3[3] | 98 | 60 | 20 | 3 | 4 | 2 |
| Comparative Example 2-13 | PVA2-31 | 1,700 | — | 98 | 60 | 24 | 1 | 2 | 1 |

[1] Solubility of PVA 2-19 was too Low to Prepare 4 mass % Aqueous Solution of PVA, so that Release Paper Base Paper was not Evaluated.
[2] 4 mass % Aqueous Solution of PVA 2-20 was Turbid.
[3] Ethylene Modification Rate From the evaluation results in Table 5, it is understood that the release paper base paper of the present invention containing specific POA modified PVA is excellent in filling properties, grease resistance, and waterproofness (Examples 2-1 through 2-19). Meanwhile, in a case that the viscosity average degree of polymerization, the POA group modification rate, or the degree of saponification of the POA modified PVA does not satisfy the prescribed range (Comparative Examples 2-1 through 2-4), in a case that the POA group does not satisfy the prescribed structure (Comparative Examples 2-5 through 2-11), and in a case that PVA not containing a POA group was used (Comparative Examples 2-12 and 2-13), it is understood that the filling properties, the grease resistance, and the waterproofness of the release paper base paper thus obtained decreased.

As demonstrated in Examples above, since the release paper base paper of the present invention contains specific POA modified PVA, it is excellent in filling properties, grease resistance, and waterproofness. Therefore, it is effective for improvement of the problems, such as permeation of the release agent in the base sheet occurring in coating the release agent to form a release layer and a release failure trouble due to elution of the release layer in water, which becomes a problem in using a water dispersible silicone resin and a water dispersible adhesive.

Production Example 3-1

Production of PVA 3-1

By a method same as that in Production Example 1-1, POA modified PVA (PVA 3-1) was obtained. Results of measuring the viscosity average degree of polymerization, the degree of saponification, and the POA group modification rate of PVA 3-1 are shown in Table 6.

Production Examples 3-2 Through 3-15, 3-18 Through 3-25, and 3-27

Production of PVA 3-2 Through 3-15, 3-18 Through 3-25, and 3-27

Various types of POA modified PVA (3-2 through 3-15, 3-18 through 3-25, and 3-27) were obtained by a method same as that in Production Example 1-1 other than modifying the amounts of charging vinyl acetate and methanol (before starting polymerization), the type (Table 2) of the unsaturated monomer having a POA group used for polymerization, the amount of using the same, the rate of polymerization, the concentration of POA modified PVAc during saponification, and the molar ratio of sodium hydroxide to vinyl acetate units, as shown in Table 6. Results of measuring the viscosity average degree polymerization, the degree of saponification, and the POA group modification rate of these types of POA modified PVA are shown in Table 7.

Production Example 3-16

Production of PVA 3-16

By a method same as that in Production Example 1-14, POA modified PVA (PVA 3-16) was obtained. Results of measuring the viscosity average degree of polymerization, the degree of saponification, and the POA group modification rate of PVA 3-16 are shown in Table 7.

Production Examples 3-17 and 3-26

Production of PVA 3-17 and 3-26

Various types of POA modified PVA (PVA 3-17 and 3-26) were obtained by a method same as that in Production Example 1-14 other than modifying the type (Table 2) of the unsaturated monomer having a POA group used for polymerization and the amount of using the same, as shown in Table 6. Results of measuring the viscosity average degree of polymerization, the degree of saponification, and the POA group modification rate of these types of POA modified PVA are shown in Table 7.

Production Examples 3-28 and 3-29

Production of PVA 3-28 and 3-29

By a method same as that in Production Examples 1-26 and 1-27, PVA 2-28 and 2-29 were obtained. Results of measuring the viscosity average degree of polymerization, the degree of saponification, and the POA group modification rate of these types of POA modified PVA are shown in Table 7.

Production Example 3-30

Production of PVA 3-30

By a method same as that in Production Example 2-30, Et modified PVA (PVA 3-30) was obtained. Results of measuring the viscosity average degree of polymerization, the degree of saponification, and the ethylene modification rate of PVA 3-30 are shown in Table 7.

Production Example 3-31

Production of PVA 3-31

By a method same as that in Production Example 2-31, unmodified PVA (PVA 3-31) was obtained. Results of measuring the viscosity average degree of polymerization and the degree of saponification are shown in Table 7.

TABLE 6

| | | Charge[1] | | | | | Saponification Conditions | |
| --- | --- | --- | --- | --- | --- | --- | --- | --- |
| | | | | Unsaturated Monomer having POA Group | | | | |
| | PVA | Vinyl Acetate (g) | Methanol (Before Starting Polymerization) (g) | Type | Amount of Use (g) | Rate of Polymerization (%) | PVAc Concentration (%) | NaOH Molar Ratio[2] |
| Production Example 3-1 | PVA3-1 | 900 | 100 | A | 17 | 30 | 25 | 0.03 |
| Production Example 3-2 | PVA3-2 | 850 | 150 | A | 15 | 30 | 25 | 0.03 |
| Production Example 3-3 | PVA3-3 | 750 | 250 | A | 17 | 40 | 25 | 0.03 |
| Production Example 3-4 | PVA3-4 | 1000 | 0 | A | 9 | 10 | 20 | 0.03 |
| Production Example 3-5 | PVA3-5 | 400 | 600 | A | 11 | 50 | 25 | 0.03 |
| Production Example 3-6 | PVA3-6 | 850 | 150 | A | 15 | 30 | 25 | 0.01 |
| Production Example 3-7 | PVA3-7 | 850 | 150 | A | 15 | 30 | 25 | 0.0075 |
| Production Example 3-8 | PVA3-8 | 850 | 150 | A | 62 | 30 | 25 | 0.03 |
| Production Example 3-9 | PVA3-9 | 850 | 150 | A | 140 | 30 | 25 | 0.03 |
| Production Example 3-10 | PVA3-10 | 850 | 150 | A | 455 | 30 | 25 | 0.03 |
| Production Example 3-11 | PVA3-11 | 850 | 150 | A | 4 | 30 | 25 | 0.03 |
| Production Example 3-12 | PVA3-12 | 850 | 150 | B | 11 | 30 | 25 | 0.03 |
| Production Example 3-13 | PVA3-13 | 850 | 150 | D | 14 | 30 | 25 | 0.03 |
| Production Example 3-14 | PVA3-14 | 850 | 150 | E | 21 | 30 | 25 | 0.03 |
| Production Example 3-15 | PVA3-15 | 850 | 150 | H | 15 | 30 | 25 | 0.03 |

TABLE 6-continued

| | | Charge[1] | | | | Saponification Conditions | |
|---|---|---|---|---|---|---|---|
| | | Vinyl Acetate (g) | Methanol (Before Starting Polymerization) (g) | Unsaturated Monomer having POA Group | | PVAc Concentration (%) | NaOH Molar Ratio[2] |
| | PVA | | | Type | Amount of Use (g) | Rate of Polymerization (%) | |
| Production Example 3-16 | PVA3-16 | 850 | 150 | I | 42 | 30 | 25 | 0.03 |
| Production Example 3-17 | PVA3-17 | 850 | 150 | K | 135 | 30 | 25 | 0.03 |
| Production Example 3-18 | PVA3-18 | 850 | 150 | M | 19 | 30 | 25 | 0.03 |
| Production Example 3-19 | PVA3-19 | 200 | 800 | A | 8 | 75 | 25 | 0.03 |
| Production Example 3-20 | PVA3-20 | 850 | 150 | A | 15 | 30 | 25 | 0.003 |
| Production Example 3-21 | PVA3-21 | 850 | 150 | A | 869 | 30 | 25 | 0.03 |
| Production Example 3-22 | PVA3-22 | 850 | 150 | A | 2 | 30 | 25 | 0.03 |
| Production Example 3-23 | PVA3-23 | 850 | 150 | C | 6 | 30 | 25 | 0.03 |
| Production Example 3-24 | PVA3-24 | 850 | 150 | F | 32 | 30 | 25 | 0.03 |
| Production Example 3-25 | PVA3-25 | 850 | 150 | G | 13 | 30 | 25 | 0.03 |
| Production Example 3-26 | PVA3-26 | 850 | 150 | J | 28 | 30 | 25 | 0.03 |
| Production Example 3-27 | PVA3-27 | 850 | 150 | L | 10 | 30 | 25 | 0.03 |
| Production Example 3-28 | PVA3-28 | 850 | 150 | Compound III | 15 | 30 | 25 | 0.03 |
| Production Example 3-29 | PVA3-29 | 850 | 150 | Compound IV | 15 | 30 | 25 | 0.03 |
| Production Example 3-30 | PVA3-30 | 750 | 250 | (Ethylene) | — | 20 | 29 | 0.03 |
| Production Example 3-31 | PVA3-31 | 700 | 300 | — | — | 40 | 25 | 0.03 |

[1]In All Production Examples, 0.25 g of 2,2'-Azobisisobutyronitrile (AIBN) was used for Polymerization Initiator.
[2]Molar Ratio of Sodium Hydroxide (NaOH) to Vinyl Acetate Units in PVAc Example 3-1

Production of Greaseproof Paper

Uncoated board (paper substrate) having basis weight of 350 g/m² was heated to 60° C., and on one surface thereof, a 4% aqueous solution of the PVA 3-1 was hand coated as a coating agent (temperature of 30° C.) using a meyer bar so as to have an amount of coating of 1.0 g/m² per side of the paper substrate with respect to solid content. Next, it was dried using a hot air drier at 100° C. for 30 seconds and humidity conditioned at 20° C. and 65% RH for 72 hours, and super calender treatment was performed once in the conditions of 150° C., 250 kg/cm, and 10 m/minute to obtain greaseproof paper having a coated layer formed on the surface of the paper substrate. Regarding the greaseproof paper thus obtained, the grease resistance, the practical grease resistance, and the waterproofness were evaluated in the following methods. Evaluation results are shown in Table 7.

[Grease Resistance]

Evaluation of grease resistance was carried out as follows in accordance with TAPPI UM-557. One drop of a test liquid having a different mixture ratio of castor oil, toluene, and n-heptane was dropped on a surface of the greaseproof paper obtained in Example 3-1, and the dropped test liquid was wiped with tissue paper after 15 seconds. At this time, it was rejected in a case that there was a stain due to permeation of the test liquid, that is, an oil content penetrated to create a wet area or a clear black spot was found, and it was accepted in a case that these stain and black spot were not found. The measurement was carried out five times, and an average of largest liquid numbers that were accepted in each measurement was taken as a kit index to evaluate the grease resistance. In TAPPI UM-557, the maximum kit index is 12, and a larger kit index means higher grease resistance.

[Practical Grease Resistance]

Using a 2 kg roller made of rubber, greaseproof paper was folded and 0.1 ml of salad oil was dropped on the fold of the greaseproof paper to be left at 20° C. for ten seconds. The salad oil was wiped with gauze and permeation through (bleed through) the back side of the greaseproof paper was confirmed visually to determine in accordance with the following criteria.

◯: No bleed through at all
Δ: Partial bleed through
X: Mostly bleed through

[Waterproofness]

After dropping approximately 1 ml of ion exchange water at 20° C. on a surface of the coating layer of the greaseproof paper, that area was rubbed with a fingertip and the number of rubbing was measured when it was felt slimy on the finger tip for the first time (wet rub test) to determine the waterproofness in accordance with the following criteria.

5: Not less than 30 times
4: not less than 20 times and less than 30 times
3: Not less than ten times and less than 20 times
2: Not less than five times and less than ten times
1: Less than five times Examples 3-2 Through 3-18 and Comparative Examples 3-1 Through 3-13

Greaseproof paper was obtained in a same manner as those in Example 3-1 other than using various types of PVA shown in Table 7 instead of PVA 3-1. Regarding the greaseproof paper thus obtained, the grease resistance, the practical grease resistance, and the waterproofness were evaluated in a same manner as those in Example 3-1. Evaluation results thereof are shown in Table 7.

Example 3-19

Greaseproof paper was obtained in a same manner as those in Example 3-3 other than modifying the temperature of the paper substrate in coating the coating agent containing POA modified PVA (PVA 3-3) to 20° C. Regarding the greaseproof paper thus obtained, the grease resistance, the practical grease resistance, and the waterproofness were evaluated in a same manner as those in Example 3-1. Evaluation results thereof are shown in Table 7.

Examples 3-20 through 3-22

Greaseproof paper was obtained in a same manner as those in Example 3-2 other than modifying the amount (solid content equivalent) of coating the coating agent containing POA modified PVA (PVA 3-2) as shown in Table 7. Regarding the greaseproof paper thus obtained, the grease resistance, the practical grease resistance, and the waterproofness were evaluated in a same manner as those in Example 3-1. Evaluation results thereof are shown in Table 7.

TABLE 7

| | | PVA | | | Temperature of Paper Substrate ° C. |
|---|---|---|---|---|---|
| | Type | Viscosity Average Degree of Polymerization | Degree of Saponification (mol %) | POA Group Modification Rate (mol %) | |
| Example 3-1 | PVA3-1 | 3,000 | 98 | 0.2 | 60 |
| Example 3-2 | PVA3-2 | 2,400 | 98 | 0.2 | 60 |
| Example 3-3 | PVA3-3 | 1,700 | 98 | 0.2 | 60 |
| Example 3-4 | PVA3-4 | 4,800 | 98 | 0.2 | 60 |
| Example 3-5 | PVA3-5 | 500 | 98 | 0.2 | 60 |
| Example 3-6 | PVA3-6 | 2,400 | 88 | 0.2 | 60 |
| Example 3-7 | PVA3-7 | 2,400 | 60 | 0.2 | 60 |
| Example 3-8 | PVA3-8 | 2,400 | 98 | 0.8 | 60 |
| Example 3-9 | PVA3-9 | 2,400 | 98 | 1.8 | 60 |
| Example 3-10 | PVA3-10 | 2,400 | 98 | 5.0 | 60 |
| Example 3-11 | PVA3-11 | 2,400 | 98 | 0.05 | 60 |
| Example 3-12 | PVA3-12 | 2,400 | 98 | 0.2 | 60 |
| Example 3-13 | PVA3-13 | 2,400 | 98 | 0.2 | 60 |
| Example 3-14 | PVA3-14 | 2,400 | 98 | 0.2 | 60 |
| Example 3-15 | PVA3-15 | 2,400 | 98 | 0.2 | 60 |
| Example 3-16 | PVA3-16 | 2,400 | 98 | 0.2 | 60 |
| Example 3-17 | PVA3-17 | 2,400 | 98 | 0.2 | 60 |
| Example 3-18 | PVA3-18 | 2,400 | 98 | 0.2 | 60 |
| Example 3-19 | PVA3-3 | 1,700 | 98 | 0.2 | 20 |
| Example 3-20 | PVA3-2 | 2,400 | 98 | 0.2 | 60 |
| Example 3-21 | PVA3-2 | 2,400 | 98 | 0.2 | 60 |
| Example 3-22 | PVA3-2 | 2,400 | 98 | 0.2 | 60 |
| Comparative Example 3-1 | PVA3-19 | 100 | 98 | 0.2 | 60 |
| Comparative Example 3-2[1)] | PVA3-20 | 2,400 | 30 | 0.2 | — |
| Comparative Example 3-3[2)] | PVA3-21 | 2,400 | 98 | 11 | 60 |
| Comparative Example 3-4 | PVA3-22 | 2,400 | 98 | 0.02 | 60 |
| Comparative Example 3-5 | PVA3-23 | 2,400 | 98 | 0.2 | 60 |
| Comparative Example 3-6 | PVA3-24 | 2,400 | 98 | 0.2 | 60 |
| Comparative Example 3-7 | PVA3-25 | 2,400 | 98 | 0.2 | 60 |
| Comparative Example 3-8 | PVA3-26 | 2,400 | 98 | 0.2 | 60 |
| Comparative Example 3-9 | PVA3-27 | 2,400 | 98 | 0.2 | 60 |
| Comparative Example 3-10 | PVA3-28 | 2,400 | 98 | 0.2 | 60 |
| Comparative Example 3-11 | PVA3-29 | 2,400 | 98 | 0.2 | 60 |
| Comparative Example 3-12 | PVA3-30 | 1,700 | 98 | 3.0[3)] | 60 |
| Comparative Example 3-13 | PVA3-31 | 1,700 | 98 | — | 60 |

| | Coating Amount of Coating Agent[4)] (g/m$^2$) | Evaluation Results of Greaseproof Paper | | |
|---|---|---|---|---|
| | | Grease Resistance | Practical Grease Resistance | Waterproofness |
| Example 3-1 | 1.0 | 10 | ○ | 5 |
| Example 3-2 | 1.0 | 9 | ○ | 5 |
| Example 3-3 | 1.0 | 8 | ○ | 5 |
| Example 3-4 | 1.0 | 7 | ○ | 5 |
| Example 3-5 | 1.0 | 6 | Δ | 5 |
| Example 3-6 | 1.0 | 7 | ○ | 4 |
| Example 3-7 | 1.0 | 6 | ○ | 3 |
| Example 3-8 | 1.0 | 9 | ○ | 5 |
| Example 3-9 | 1.0 | 8 | ○ | 5 |
| Example 3-10 | 1.0 | 8 | ○ | 4 |
| Example 3-11 | 1.0 | 6 | Δ | 3 |
| Example 3-12 | 1.0 | 7 | Δ | 5 |
| Example 3-13 | 1.0 | 8 | ○ | 5 |
| Example 3-14 | 1.0 | 7 | Δ | 5 |
| Example 3-15 | 1.0 | 8 | ○ | 5 |
| Example 3-16 | 1.0 | 8 | ○ | 5 |
| Example 3-17 | 1.0 | 8 | ○ | 5 |
| Example 3-18 | 1.0 | 10 | ○ | 5 |
| Example 3-19 | 1.0 | 6 | ○ | 4 |
| Example 3-20 | 2.0 | 10 | ○ | 5 |
| Example 3-21 | 3.0 | 11 | ○ | 5 |
| Example 3-22 | 5.0 | 12 | ○ | 5 |
| Comparative Example 3-1 | 1.0 | 1 | X | 2 |
| Comparative Example 3-2[1)] | — | — | — | — |

TABLE 7-continued

| | | | | |
|---|---|---|---|---|
| Comparative Example 3-3[2] | 1.0 | 2 | X | 1 |
| Comparative Example 3-4 | 1.0 | 1 | X | 2 |
| Comparative Example 3-5 | 1.0 | 2 | X | 2 |
| Comparative Example 3-6 | 1.0 | 1 | X | 2 |
| Comparative Example 3-7 | 1.0 | 2 | X | 1 |
| Comparative Example 3-8 | 1.0 | 2 | X | 1 |
| Comparative Example 3-9 | 1.0 | 1 | X | 1 |
| Comparative Example 3-10 | 1.0 | 4 | Δ | 2 |
| Comparative Example 3-11 | 1.0 | 2 | X | 2 |
| Comparative Example 3-12 | 1.0 | 4 | Δ | 2 |
| Comparative Example 3-13 | 1.0 | 1 | X | 1 |

[1] Solubility of PVA 3-20 was too Low to Prepare 4 mass % Aqueous Solution of PVA, so that Greaseproof Paper was not Evaluated.
[2] 4 mass % Aqueous Solution of PVA 3-21 was Turbid.
[3] Ethylene Modification Rate
[4] Solid Content Equivalent From the evaluation results in Table 7, it is understood that the greaseproof paper of the present invention containing specific POA modified PVA is excellent in grease resistance and waterproofness (Examples 3-1 through 3-22). It is also understood that the grease resistance becomes higher with an increase of the amount of coating (Examples 3-2 and 3-20 through 3-22). Meanwhile, in a case that the viscosity average degree of polymerization, the degree of saponification, or the POA group modification rate of the POA modified PVA does not satisfy the prescribed range (Comparative Examples 3-1 through 3-4), in a case that the POA group does not satisfy the prescribed structure (Comparative Examples 3-5 through 3-11), and in a case that PVA not containing a POA group was used (Comparative Examples 3-12 and 3-13), it is understood that the grease resistance and/or the waterproofness of the greaseproof paper thus obtained is poor.

Example 4-1

Production of (PVA 4-1)

By a method same as that in Production Example 1-1 other than the amount of using the unsaturated monomer having a POA group being as shown in Table 8, POA modified PVA (PVA 4-1) was obtained. Results of measuring the viscosity average degree of polymerization, the degree of saponification, the POA group modification rate of the POA modified PVA thus obtained, and the viscosity of the aqueous PVA solution are shown in Table 9.

Production of PVA Film

PVA 4-1 was dissolved in water to prepare a 4% aqueous solution, and after flow casting it on a polyethylene terephthalate film, it was dried at 20° C. for one week and then was separated from the polyethylene terephthalate to obtain a film having a thickness of 100 μm. Using this PVA film, the strength and the stretching properties of the film were evaluated in the following methods. Results are shown in Table 9.
[Strength-Elongation of Film]
A sample obtained by cutting a single layer PVA film having a thickness of 100 μm into a width of 10 mm and humidity conditioning at 20° C. and 85% RH for one week was served for strength-elongation measurement. The strength-elongation measurement was carried out using an autograph AG-IS manufactured by Shimadzu Corporation in the conditions of a distance between chucks of 50 mm and a tensile rate of 500 mm/minute. The film strength properties were evaluated by the tensile elastic modulus, and the stretching properties of the film were evaluated by the elongation. The measurement was carried out for five samples per PVA film. The average value of the five samples was obtained to evaluate by the following evaluation criteria.
(Strength Properties)
A: Not less than 10 kg/mm$^2$
B: Not less than 5 kg/mm$^2$ and less than 10 kg/mm$^2$
C: Not less than 3 kg/mm$^2$ and less than 5 kg/mm$^2$
D: Less than 3 kg/mm$^2$
(Stretching Properties)
A: Not less than 400%
B: Not less than 300% and less than 400%
C: Not less than 200% and less than 300%
D: Less than 200%

Production Examples 4-2 Through 4-13, 4-16 Through 4-22, 4-24, and 4-25

Production of PVA 4-2 Through 4-13, 4-16 Through 4-22, 4-24, and 4-25

Various types of POA modified PVA (PVA 4-2 through 4-13, 4-16 through 4-22, 4-24, and 4-25) were obtained by a method same as that in Production Example 1-1 other than modifying the amounts of charging vinyl acetate and methanol (before starting polymerization), the type (Table 2) of the unsaturated monomer having a POA group used for polymerization, the amount of using the same, the rate of polymerization, the concentration of POA modified PVAc during saponification, and the molar ratio of sodium hydroxide to vinyl acetate units, as shown in Table 8. Results of measuring the viscosity average degree of polymerization, the degree of saponification, the POA group modification rate of these types of POA modified PVA, and the viscosity of the aqueous PVA solution are shown in Table 9.

Examples 4-2 Through 4-13 and 4-16 and Comparative Examples 4-1 Through 4-7 and 4-9

The viscosity of each aqueous solution of PVA 4-2 through 4-13, 4-16 through 4-22, 4-24, and 4-25 was measured in the method described above. Using each PVA, a PVA film was produced by a method same as that in Example 4-1. Regarding each film thus obtained, the strength and the stretching properties of the film were evaluated by a method same as that in Example 4-1.
Results of evaluating each PVA and the film produced by using the same are shown in Table 9, respectively.
Production Example 4-14 (Production of PVA 4-14)
By a method same as that in Production Example 1-14, POA modified PVA (PVA 4-14) was obtained. Results of measuring the viscosity average degree of polymerization, the degree of saponification, and the POA group modification rate of PVA 4-14 are shown in Table 9.

Example 4-14

The viscosity of a PVA 4-14 aqueous solution was measured in the method described above. Using PVA 4-14, a PVA film was produced by a method same as that in Example 4-1. Regarding the film thus obtained, the strength and the stretching properties of the film were evaluated by a method same as that in Example 4-1. Results of evaluating PVA 4-14 and the film produced by using the same are shown in Table 9, respectively.

Production Examples 4-15 and 4-23

Production of PVA 4-15 and 4-23

Various types of POA modified PVA (PVA 4-15 and 4-23) were obtained by a method same as that in Production Example 1-14 other than modifying the type (Table 2) of the unsaturated monomer having a POA group used for polymerization, the amount of using the same, and the molar ratio of sodium hydroxide to vinyl acetate units during saponification, as shown in Table 8. Results of measuring the viscosity average degree of polymerization, the degree of saponification, and the POA group modification rate of these types of POA modified PVA are shown in Table 9.

Example 4-15 and Comparative Example 4-8

The viscosity of each aqueous solution of PVA 4-15 and 4-23 was measured in the method described above. Using each PVA, a PVA film was produced by a method same as that in Example 4-1. Regarding the films thus obtained, the strength and the stretching properties of the films were evaluated by a method same as that in Example 4-1. Results of evaluating PVA 4-15 and 4-23 and the films produced by using the same are shown in Table 9, respectively.

Production Examples 4-26 and 4-27

Production of PVA 4-26 and 4-27

Various types of modified PVA (PVA 4-26 and 4-27) were obtained by a method same as that in Production Example 1-1 other than using the compound III or IV as the unsaturated monomer having a POA group that is used for polymerization and modifying the amount of using the same, the amounts of charging vinyl acetate and methanol (before starting polymerization), and the molar ratio of sodium hydroxide to vinyl acetate units during saponification, as shown in Table 8. Results of measuring the viscosity average degree of polymerization, the degree of saponification, and the POA group modification rate of these types of POA modified PVA are shown in Table 9.

Comparative Examples 4-10 and 4-11

The viscosity of the aqueous solutions of PVA thus obtained was measured in the method described above. Using the POA modified PVA thus obtained (PVA 4-26 and 4-27), respective PVA films were produced by a method same as that in Example 4-1. Regarding the films thus obtained, the strength and the stretching properties of the films were evaluated by a method same as that in Example 4-1. Results of evaluating PVA 4-26 and 4-27 and the films produced by using the same are shown in Table 9, respectively.

The conditions of producing PVA 4-1 through 4-27 are shown in Table 8, the structures of the unsaturated monomers having a POA group (the monomer structures correspond to the general formula (II)) are shown in Table 2, and the results of evaluating the various types of POA modified PVA and the films produced by using them are shown in Table 9.

TABLE 8

| | | Charge[1] | | | | Saponification Conditions | |
| | | Vinyl Acetate (g) | Methanol (Before Starting Polymerization) (g) | Unsaturated Monomer having POA Group | | Rate of Polymerization (%) | PVAc Concentration (%) | NaOH Molar Ratio[2] |
| | PVA | | | Type | Amount of Use (g) | | | |
|---|---|---|---|---|---|---|---|---|
| Production Example 4-1 | PVA 4-1 | 900 | 100 | A | 16 | 30 | 25 | 0.03 |
| Production Example 4-2 | PVA 4-2 | 850 | 150 | A | 15 | 30 | 25 | 0.03 |
| Production Example 4-3 | PVA 4-3 | 750 | 250 | A | 17 | 40 | 25 | 0.03 |
| Production Example 4-4 | PVA 4-4 | 400 | 600 | A | 11 | 50 | 25 | 0.03 |
| Production Example 4-5 | PVA 4-5 | 850 | 150 | A | 15 | 30 | 25 | 0.0075 |
| Production Example 4-6 | PVA 4-6 | 850 | 150 | A | 15 | 30 | 25 | 0.005 |
| Production Example 4-7 | PVA 4-7 | 850 | 150 | A | 62 | 30 | 25 | 0.03 |
| Production Example 4-8 | PVA 4-8 | 850 | 150 | A | 140 | 30 | 25 | 0.03 |
| Production Example 4-9 | PVA 4-9 | 850 | 150 | A | 4 | 30 | 25 | 0.03 |
| Production Example 4-10 | PVA 4-10 | 850 | 150 | B | 11 | 30 | 25 | 0.03 |
| Production Example 4-11 | PVA 4-11 | 850 | 150 | D | 14 | 30 | 25 | 0.03 |
| Production Example 4-12 | PVA 4-12 | 850 | 150 | E | 21 | 30 | 25 | 0.03 |
| Production Example 4-13 | PVA 4-13 | 850 | 150 | H | 15 | 30 | 25 | 0.03 |
| Production Example 4-14 | PVA 4-14 | 850 | 150 | I | 42 | 30 | 25 | 0.03 |
| Production Example 4-15 | PVA 4-15 | 850 | 150 | K | 135 | 30 | 25 | 0.03 |
| Production Example 4-16 | PVA 4-16 | 200 | 800 | A | 8 | 75 | 25 | 0.03 |
| Production Example 4-17 | PVA 4-17 | 850 | 150 | A | 15 | 30 | 25 | 0.003 |
| Production Example 4-18 | PVA 4-18 | 850 | 150 | C | 6 | 30 | 25 | 0.0075 |
| Production Example 4-19 | PVA 4-19 | 850 | 150 | A | 869 | 30 | 25 | 0.0075 |
| Production Example 4-20 | PVA 4-20 | 850 | 150 | A | 2 | 30 | 25 | 0.0075 |
| Production Example 4-21 | PVA 4-21 | 850 | 150 | F | 32 | 30 | 25 | 0.0075 |
| Production Example 4-22 | PVA 4-22 | 850 | 150 | G | 13 | 30 | 25 | 0.0075 |
| Production Example 4-23 | PVA 4-23 | 850 | 150 | J | 28 | 30 | 25 | 0.0075 |
| Production Example 4-24 | PVA 4-24 | 850 | 150 | L | 10 | 30 | 25 | 0.0075 |

TABLE 8-continued

| | | | Charge[1] | | | | Saponification Conditions | | |
|---|---|---|---|---|---|---|---|---|---|
| | | Vinyl Acetate (g) | Methanol (Before Starting Polymerization) (g) | Unsaturated Monomer having POA Group | | Rate of Polymerization (%) | PVAc Concentration (%) | NaOH Molar Ratio[2] |
| | PVA | | | Type | Amount of Use (g) | | | |
| Production Example 4-25 | PVA 4-25 | 850 | 150 | M | 19 | 30 | 25 | 0.03 |
| Production Example 4-26 | PVA 4-26 | 850 | 150 | Compound III | 15 | 30 | 25 | 0.0075 |
| Production Example 4-27 | PVA 4-27 | 850 | 150 | Compound IV | 15 | 30 | 25 | 0.0075 |

[1] In All Production Examples, 0.25 g of 2,2'-Azobisisobutyronitrile (AIBN) was used for Polymerization Initiator.
[2] Molar Ratio of Sodium Hydroxide (NaOH) to Vinyl Acetate Units in PVAc

TABLE 9

| | | PVA Polymerization Results | | |
|---|---|---|---|---|
| | Type | Viscosity Average Degree of Polymerization | POA Group Modification Rate (mol %) | Degree of Saponification (mol %) |
| Example 4-1 | PVA 4-1 | 3,000 | 0.2 | 98 |
| Example 4-2 | PVA 4-2 | 2,400 | 0.2 | 98 |
| Example 4-3 | PVA 4-3 | 1,700 | 0.2 | 98 |
| Example 4-4 | PVA 4-4 | 500 | 0.2 | 98 |
| Example 4-5 | PVA 4-5 | 2,400 | 0.2 | 88 |
| Example 4-6 | PVA 4-6 | 2,400 | 0.2 | 60 |
| Example 4-7 | PVA 4-7 | 2,400 | 0.8 | 98 |
| Example 4-8 | PVA 4-8 | 2,400 | 1.8 | 98 |
| Example 4-9 | PVA 4-9 | 2,400 | 0.05 | 98 |
| Example 4-10 | PVA 4-10 | 2,400 | 0.2 | 98 |
| Example 4-11 | PVA 4-11 | 2,400 | 0.2 | 98 |
| Example 4-12 | PVA 4-12 | 2,400 | 0.2 | 98 |
| Example 4-13 | PVA 4-13 | 2,400 | 0.2 | 98 |
| Example 4-14 | PVA 4-14 | 2,400 | 0.2 | 98 |
| Example 4-15 | PVA 4-15 | 2,400 | 0.2 | 98 |
| Example 4-16 | PVA 4-25 | 2,400 | 0.2 | 98 |
| Comparative Example 4-1 | PVA4-16 | 100 | 0.2 | 98 |
| Comparative Example 4-2[1] | PVA4-17 | 2,400 | 0.2 | 30 |
| Comparative Example 4-3 | PVA4-18 | 2,400 | 0.2 | 88 |
| Comparative Example 4-4[2] | PVA4-19 | 2,400 | 11 | 88 |
| Comparative Example 4-5 | PVA4-20 | 2,400 | 0.02 | 88 |
| Comparative Example 4-6 | PVA4-21 | 2,400 | 0.2 | 88 |
| Comparative Example 4-7 | PVA4-22 | 2,400 | 0.2 | 88 |
| Comparative Example 4-8 | PVA4-23 | 2,400 | 0.2 | 88 |
| Comparative Example 4-9 | PVA4-24 | 2,400 | 0.2 | 88 |
| Comparative Example 4-10 | PVA4-26 | 2,400 | 0.2 | 88 |
| Comparative Example 4-11 | PVA4-27 | 2,400 | 0.2 | 88 |

| | PVA Evaluation Results | | | PVA film Evaluation Results | |
|---|---|---|---|---|---|
| | 20° C. | 60° C. | | | |
| | Viscosity $\eta_1$ (mPa·s) | Viscosity $\eta_1$ (mPa·s) | Viscosity Ratio $\eta_2/\eta_1$ | Strength Properties | Stretching Properties |
| Example 4-1 | 100 | 60,000 | 600.0 | A | A |
| Example 4-2 | 70 | 30,000 | 428.6 | A | A |
| Example 4-3 | 30 | 10,000 | 333.3 | B | B |
| Example 4-4 | 6 | 200 | 33.3 | C | C |
| Example 4-5 | 60 | 18,000 | 300.0 | B | A |
| Example 4-6 | 50 | 12,000 | 240.0 | C | A |
| Example 4-7 | 90 | 60,000 | 666.7 | A | A |
| Example 4-8 | 120 | 90,000 | 750.0 | B | A |
| Example 4-9 | 65 | 180 | 2.8 | B | B |
| Example 4-10 | 65 | 9,000 | 138.5 | B | A |
| Example 4-11 | 70 | 20,000 | 285.7 | A | B |
| Example 4-12 | 70 | 12,000 | 171.4 | B | A |
| Example 4-13 | 70 | 24,000 | 342.9 | A | A |
| Example 4-14 | 70 | 22,000 | 314.3 | A | A |
| Example 4-15 | 70 | 20,000 | 285.7 | A | A |
| Example 4-16 | 70 | 35,000 | 500.0 | A | A |
| Comparative Example 4-1 | 1 | 1 | 1.0 | D | D |
| Comparative Example 4-2[1] | — | — | — | — | — |
| Comparative Example 4-3 | 55 | 45 | 0.8 | D | B |

TABLE 9-continued

| | | | | | |
|---|---|---|---|---|---|
| Comparative Example 4-4[2] | 75 | 75 | 1.0 | D | D |
| Comparative Example 4-5 | 55 | 55 | 1.0 | D | C |
| Comparative Example 4-6 | 60 | 65 | 1.1 | D | B |
| Comparative Example 4-7 | 75 | 75 | 1.0 | D | B |
| Comparative Example 4-8 | 60 | 55 | 0.9 | D | B |
| Comparative Example 4-9 | 55 | 40 | 0.7 | D | B |
| Comparative Example 4-10 | 80 | 150 | 1.9 | D | B |
| Comparative Example 4-11 | 75 | 140 | 1.9 | D | B |

[1] Solubility of PVA 4-17 was too Low to Prepare 4 mass % Aqueous Solution of PVA, so that PVA and PVA Film were not Evaluated.
[2] 4 mass % Aqueous Solution of PVA 4-19 was Turbid.

From the evaluation results in Table 9, it is understood that the film containing POA modified PVA of the present invention has high strength and high stretching properties (Examples 4-1 through 4-16). Meanwhile, in a case that the degree of polymerization, the POA group modification rate, or the degree of saponification of the POA modified PVA does not satisfy the prescribed range (Comparative Examples 4-1, 4-2, 4-4, and 4-5) or in a case that the POA group does not satisfy the prescribed structure (Comparative Examples 4-3 and 4-6 through 4-11), it is understood that the strength and the stretching properties of the film containing the PVA decreased.

The invention claimed is:

1. A polyoxyalkylene modified vinyl alcohol-based polymer, comprising: a polyoxyalkylene group in a side chain, wherein
the polymer has a viscosity average degree of polymerization of not less than 150 and not more than 5000, a degree of saponification of not less than 40 mol % and not more than 99.99 mol %, and a polyoxyalkylene group modification rate of not less than 0.05 mol % and not more than 10 mol %; and
the polyoxyalkylene group comprises a polyoxypropylene block and a (poly)oxyethylene block and is represented by formula (I),

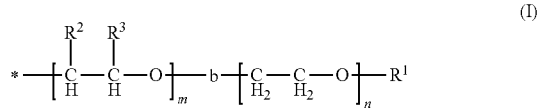

$R^1$ is a hydrogen atom or an alkyl group comprising from 1 to 8 carbon atoms;
either one of $R^2$ and $R^3$ is a methyl group and the other is a hydrogen atom;
b indicates that oxypropylene units and oxyethylene units are respectively arranged in polyoxypropylene and (poly)oxyethylene blocks;
$10 \leq m \leq 40$; and
$1 \leq n \leq 50$.

2. The polyoxyalkylene modified vinyl alcohol-based polymer according to claim 1, wherein, when measuring viscosity of a 4 mass % aqueous solution of the polyoxyalkylene modified vinyl alcohol-based polymer with a BL type viscometer at a rotor rotation speed of 6 rpm, a viscosity ratio $\eta_2/\eta_1$, where $\eta_2$ is a viscosity at 60° C. and $\eta_1$ is a viscosity at 20° C., is 2.0 or more.

3. An aqueous solution comprising the polyoxyalkylene modified vinyl alcohol-based polymer according to claim 1.

4. A method of producing the polyoxyalkylene modified vinyl alcohol-based polymer according to claim 1, the method comprising:
copolymerizing an unsaturated monomer represented by formula (II) and a vinyl ester-based monomer; and
saponifying a polyoxyalkylene modified vinyl ester-based polymer thus obtained,

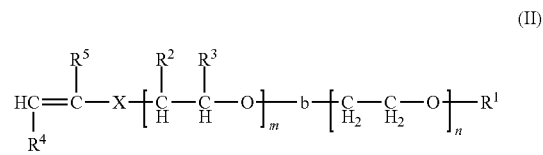

where
$R^1$ is a hydrogen atom or an alkyl group comprising from 1 to 8 carbon atoms;
either one of $R^2$ and $R^3$ is a methyl group and the other is a hydrogen atom;
$10 \leq m \leq 40$;
$1 \leq n \leq 50$;
$R^4$ is a hydrogen atom or a —COOM group, where M is a hydrogen atom, an alkali metal, or an ammonium group;
$R^5$ is a hydrogen atom, a methyl group, or a —CH$_2$—COOM group, where M is a hydrogen atom, an alkali metal, or an ammonium group; and
X is —O—, —CH$_2$—O—, —CO—, —(CH$_2$)$_k$—, —CO—O—, or —CO—NR$^6$—, where R$^6$ is a hydrogen atom or an alkyl group comprising from 1 to 4 carbon atoms and $1 \leq k \leq 15$.

5. A coating agent comprising the polyoxyalkylene modified vinyl alcohol-based polymer according to claim 1.

6. A coated article, wherein the coating agent according to claim 5 is coated on a surface of a substrate.

7. A method of producing the coated article according to claim 6, the method comprising:
coating the coating agent on the surface of the substrate having a previously adjusted temperature of not less than 50° C. and not more than 100° C.

8. An ink jet recording material, wherein the coating agent according to claim 5 is coated on a surface of a substrate.

9. A thermal paper, comprising the polyoxyalkylene modified vinyl alcohol-based polymer according to claim 1.

10. A release paper base paper comprising the polyoxyalkylene modified vinyl alcohol-based polymer according to claim 1.

11. The release paper base paper according to claim 10, wherein
the base paper has a paper substrate and a coating layer formed on a surface of the paper substrate, and
the coating layer comprises the polyoxyalkylene modified vinyl alcohol-based polymer.

12. A method of producing a release paper base paper, the method comprising:
coating the coating agent according to claim 5 on a paper substrate.

13. A release paper, comprising:
the release paper base paper according to claim 10, and
a release layer formed on a surface of the release paper base paper.

14. A laminate, comprising:
the release paper base paper according to claim 10,
a release layer formed on a surface of the release paper base paper, and
an adhesive layer formed on a surface of the release layer.

15. A greaseproof paper, comprising:
the polyoxyalkylene modified vinyl alcohol-based polymer according to claim 1.

16. The greaseproof paper according to claim 15, wherein
the greaseproof paper comprises a paper substrate and a coating layer formed on a surface of the paper substrate, and
the coating layer comprises the polyoxyalkylene modified vinyl alcohol-based polymer.

17. The greaseproof paper according to claim 16, wherein a weight of the coating layer per unit area is not less than 0.2 g/m$^2$ and not more than 20 g/m$^2$.

18. A method of producing a greaseproof paper, the method comprising: coating the coating agent according to claim 5 on a surface of a paper substrate.

19. A film, comprising the polyoxyalkylene modified vinyl alcohol-based polymer according to claim 1.

20. A method of producing the film according to claim 19, the method comprising: forming a film using a solution comprising the polyoxyalkylene modified vinyl alcohol-based polymer.

* * * * *